United States Patent [19]

Tsuchiya

[11] Patent Number: 5,936,549
[45] Date of Patent: Aug. 10, 1999

[54] OBSTACLE DETECTING APPARATUS AND VEHICLE OCCUPANT PROTECTING DEVICE USING THE SAME

[75] Inventor: Jiro Tsuchiya, Shizuoka-ken, Japan

[73] Assignee: Toyota Jidosha Kabushiki Kaisha, Toyota, Japan

[21] Appl. No.: 08/872,336

[22] Filed: Jun. 10, 1997

[30] Foreign Application Priority Data

Jun. 11, 1996 [JP] Japan ................................. 8-149224
Dec. 24, 1996 [JP] Japan ................................. 8-344072

[51] Int. Cl.$^6$ ....................................................... G08G 1/16
[52] U.S. Cl. ......................... 340/903; 340/436; 340/438; 701/301
[58] Field of Search ...................... 340/903, 438, 340/436; 180/271, 167; 701/301

[56] References Cited

U.S. PATENT DOCUMENTS 5,684,473  11/1997  Hibino et al. ........................ 340/903

*Primary Examiner*—Jeffery A. Hofsass
*Assistant Examiner*—Daryl C. Pope
*Attorney, Agent, or Firm*—Pillsbury Madison & Sutro LLP

[57] ABSTRACT

An obstacle detecting apparatus which detects the distance between an obstacle and a vehicle by two distance measuring sensors, comprising collision angle calculating device in which a plurality of positions of the obstacle is calculated by way of triangulation on the basis of the distance information from the two distance measuring sensors, and a collision angle, which is formed between the obstacle and the vehicle, is calculated by the locus of the obstacle which is calculated by the calculated plurality of positions of the obstacle.

9 Claims, 21 Drawing Sheets

F I G. 1
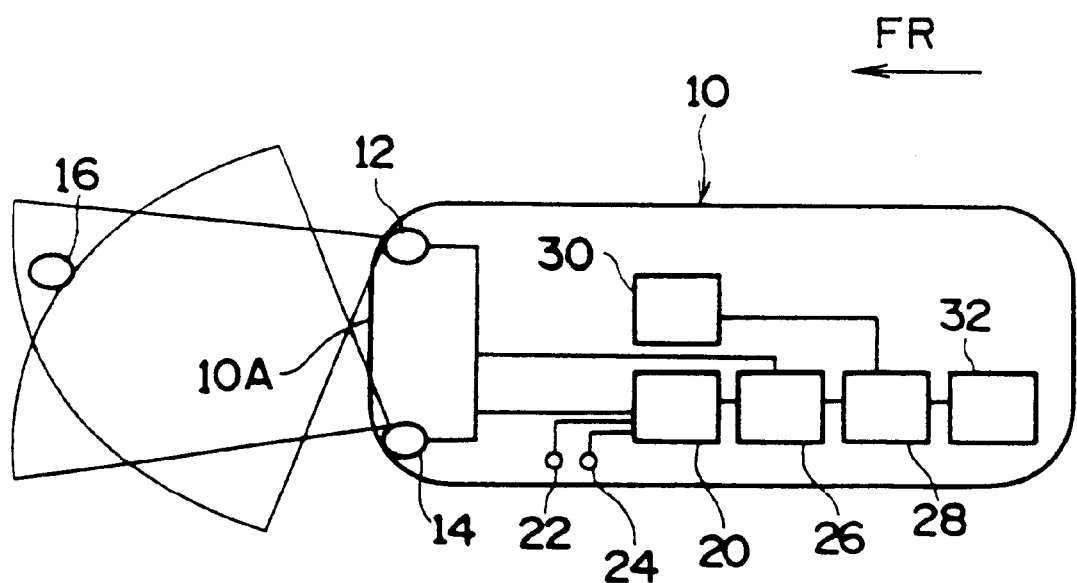

F I G. 3
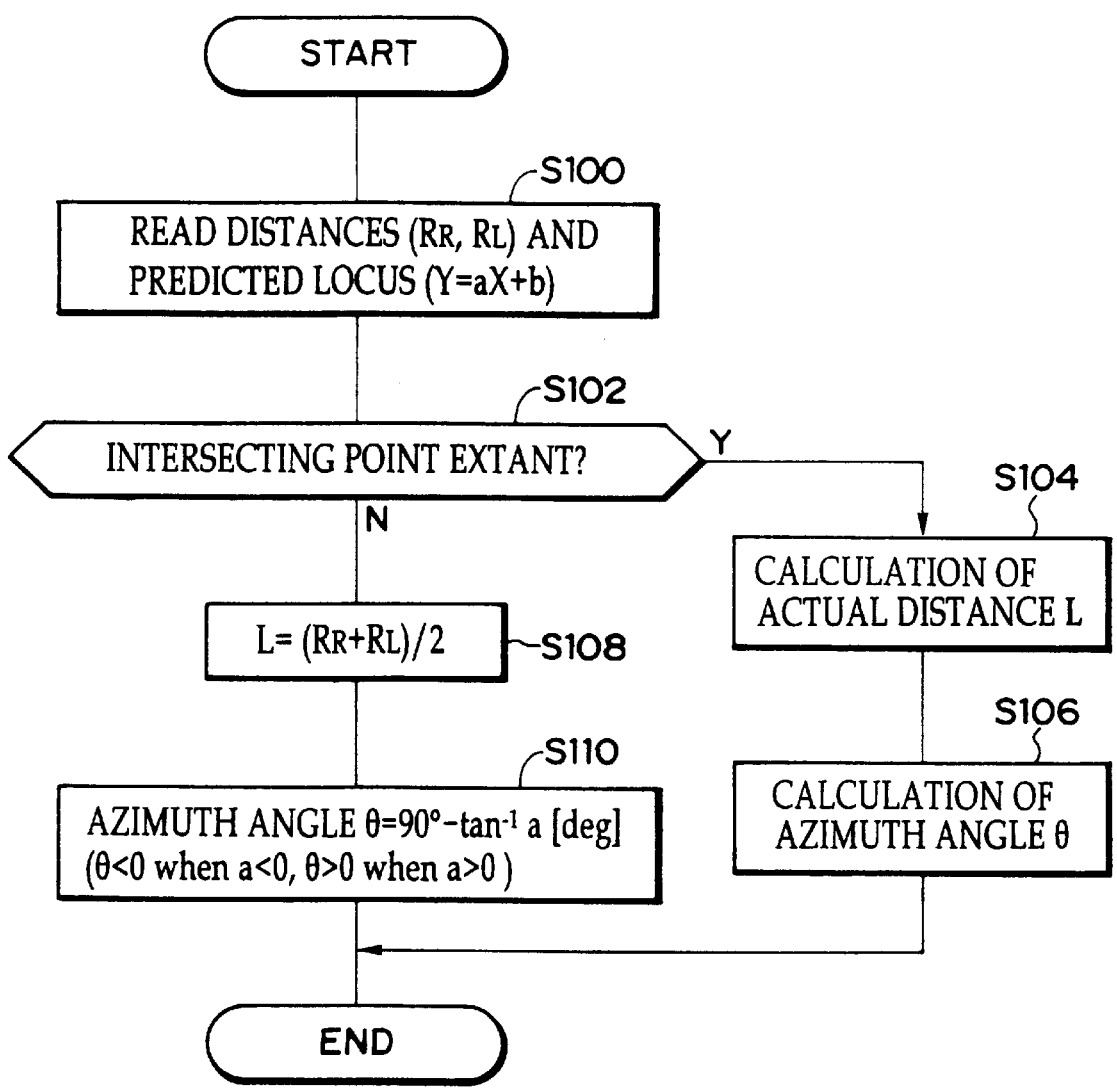

F I G. 8
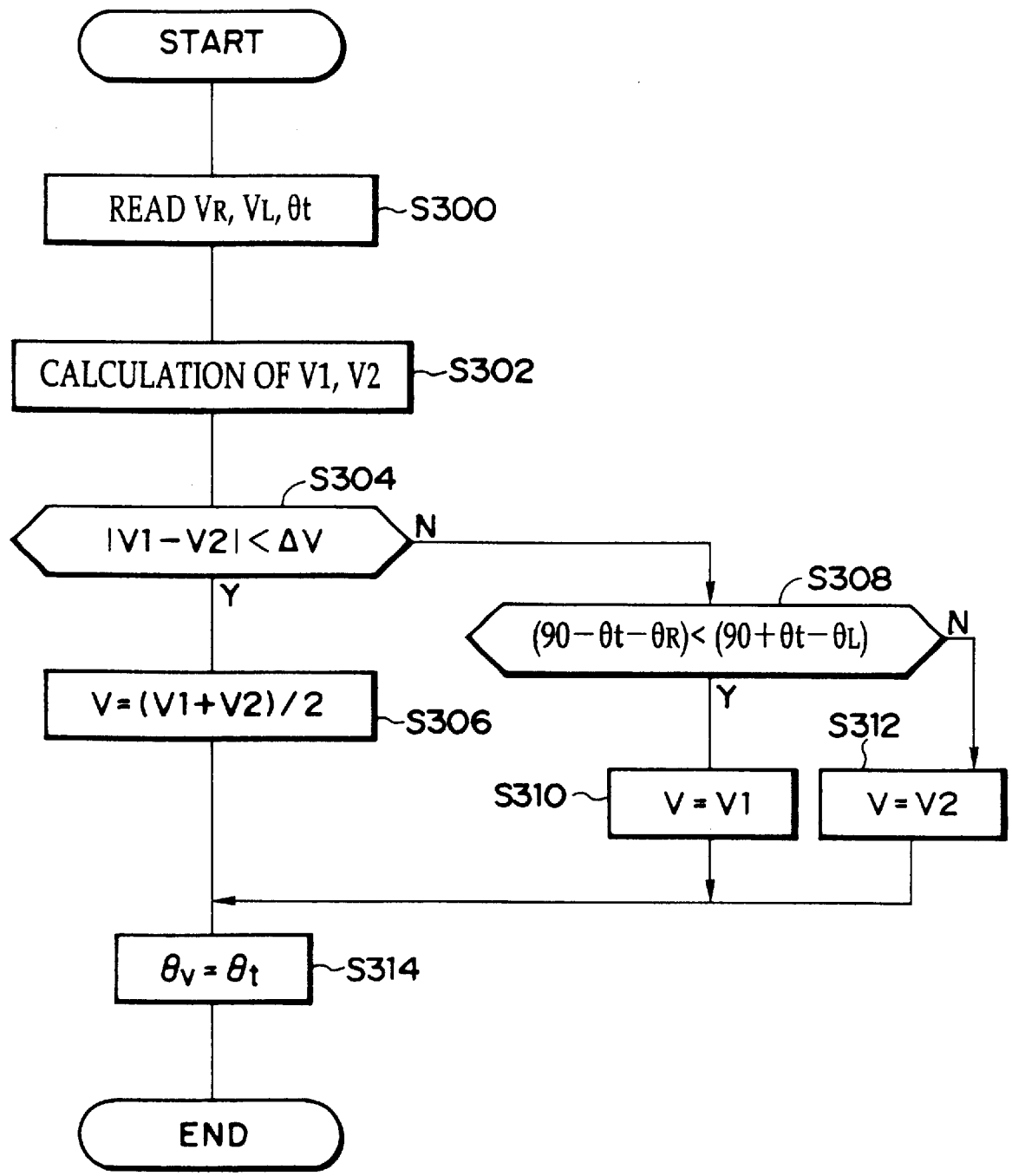

F I G. 9
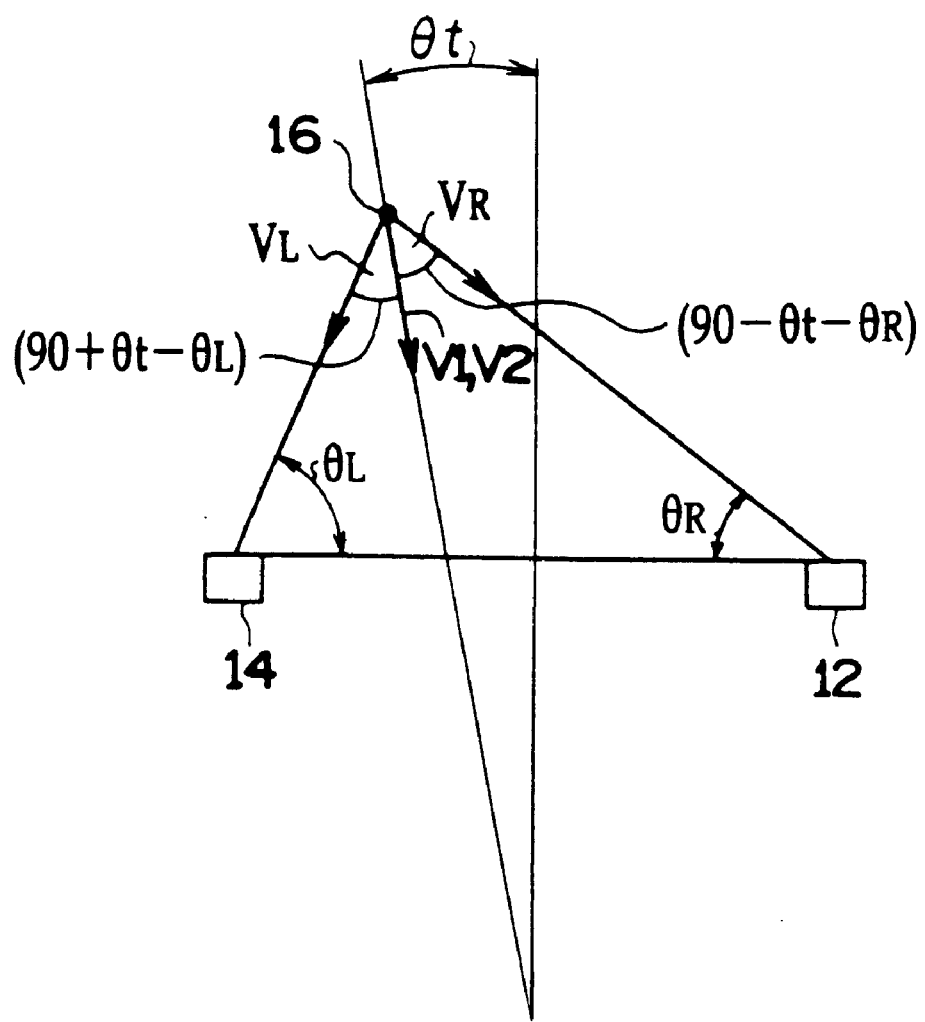

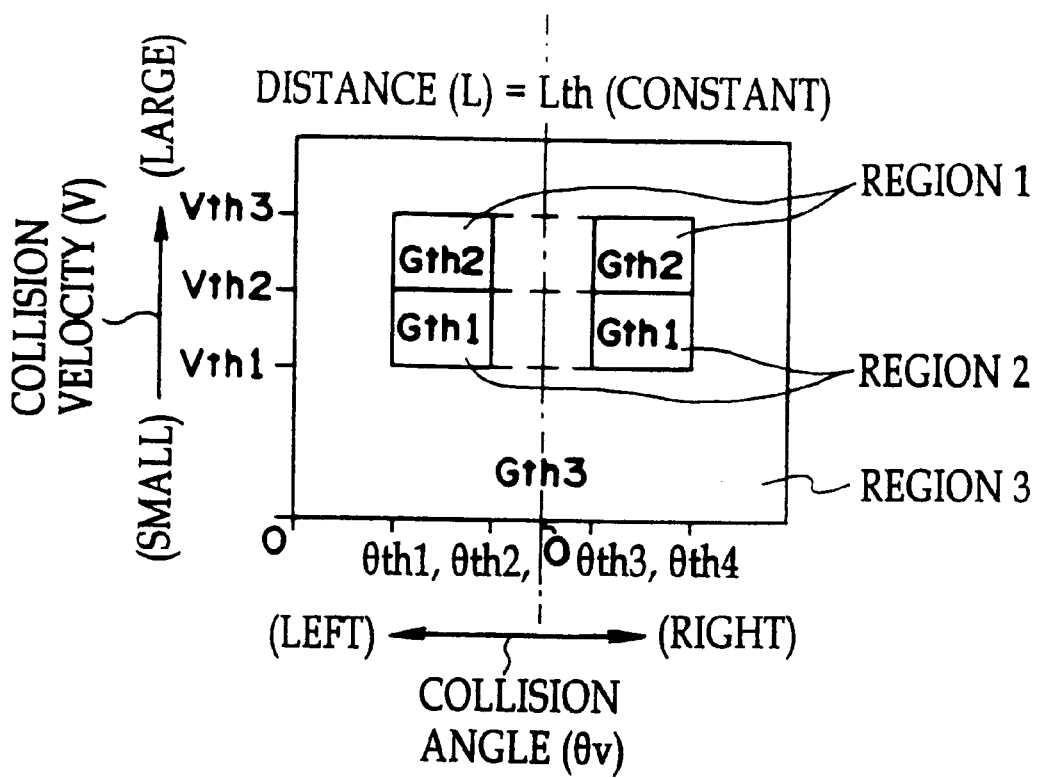
F I G. 1 1

F I G. 1 2
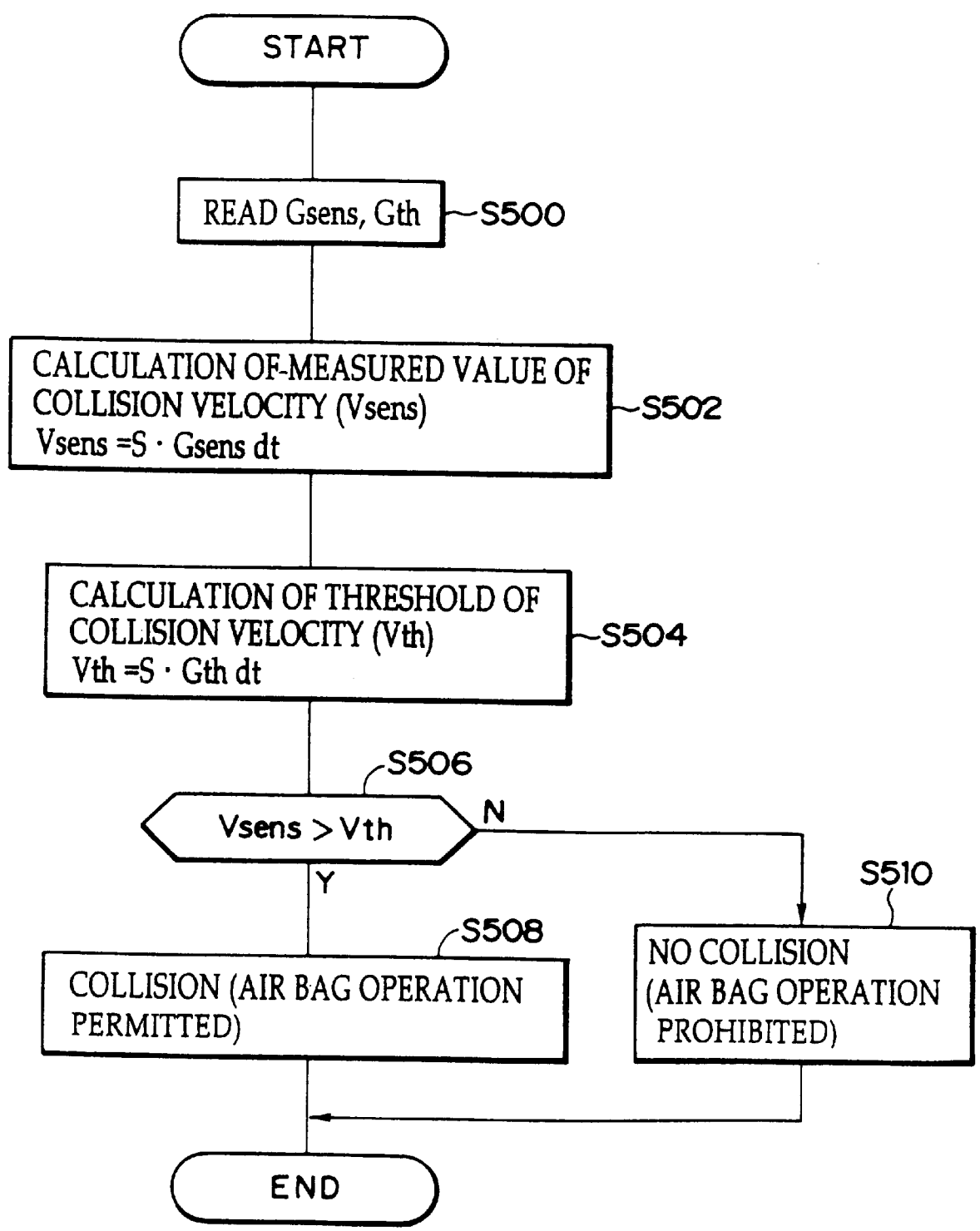

FIG. 18

| | | COLLISION ANGLE | | |
|---|---|---|---|---|
| | | $\theta1<\theta<\theta2$ | $\theta<|\theta1|$ | $-\theta1<\theta<-\theta2$ |
| COLLISION POSITION | PASS | R/L | R/L | R/L |
| | LEFT SIDE OF VEHICLE FRONT PORTION | R | R | L |
| | CENTER OF VEHICLE FRONT PORTION | R | R/L | L |
| | RIGHT SIDE OF VEHICLE FRONT PORTION | R | L | L |
| | PASS | R/L | R/L | R/L |

R: USE INFORMATION FROM RIGHT SENSOR

L: USE INFORMATION FROM LEFT SENSOR

R/L: R: USE INFORMATION FROM LEFT OR RIGHT SENSOR

⟨COLLISION ANGLE⟩
 $\theta1 : 5\,deg$
 $\theta2 : 30\,deg$

OBSTACLE DETECTING APPARATUS AND VEHICLE OCCUPANT PROTECTING DEVICE USING THE SAME

BACKGROUND OF THE INVENTION

1. Field of the Invention

The present invention relates to an obstacle detecting apparatus and a device for protecting a vehicle occupant by using the obstacle detecting apparatus, and, more specifically, to the obstacle detecting apparatus and the vehicle occupant protecting device with the use of the obstacle detecting apparatus in which the distance between a vehicle and an obstacle can be detected by using two distance measuring sensors.

2. Description of the Related Art

Conventionally, as examples of an obstacle detecting apparatus and a vehicle occupant protecting device using the same in which the distance between a vehicle and an obstacle can be detected by two distance measuring sensors, collision detecting apparatuses for detecting a collision direction and a collision intensity on the basis of a collision acceleration is disclosed in Japanese Patent Application Laid-Open (JP-A) Nos. 6-56000 and 7-223505, and structures thereof are known.

The structure which is disclosed in Japanese Patent Application Laid-Open (JP-A) No. 7-223505 will be described hereinafter.

As shown in FIG. 21, in an obstacle detecting apparatus and a vehicle occupant protecting device using the same, an obstacle 72 such as another vehicle or the like in the vicinity of a vehicle 70 is detected by obstacle detecting sensors 74, 76 which are installed in the vehicle 70. Accordingly, a vehicle occupant protecting device 80 is operated on the basis of signals output from the obstacle detecting sensors 74, 76. When it is detected that a collision has occurred at the front of the vehicle, the vehicle occupant protecting device 80 is operated on the basis of a signal output from a collision detection sensor 82 and on the basis of signals output from the obstacle detecting sensors 74, 76.

Although the obstacle detecting apparatus and the vehicle occupant protecting device using the same can detect the relative velocity of the vehicle 70 with respect to the obstacle 72, the apparatus and the device cannot detect the collision angle formed between the obstacle 72 and the vehicle 70. Accordingly, it is not possible to predict a collision state including a collision angle and a relative velocity in the direction of the collision angle (i.e., collision velocity) at the time at which the obstacle 72 and the vehicle 70 collide.

SUMMARY OF THE INVENTION

In view of the aforementioned, an object of the present invention is to provide an obstacle detecting apparatus and a vehicle occupant protecting device using the same in which a collision state in which an obstacle and a vehicle collide can be predicted beforehand.

A first aspect of the present invention is an obstacle detecting apparatus which detects the distance between the vehicle and the obstacle by two distance measuring sensors, comprising collision angle calculating means in which a plurality of positions of the obstacle is calculated via triangulation on the basis of distance information from the two distance measuring sensors, and a collision angle, which is formed between the obstacle and the vehicle, is calculated by the locus of the obstacle which is calculated by the calculated plurality of positions of the obstacle.

Accordingly, since the collision angle calculating means calculates positions of the obstacle via triangulation on the basis of distance information from the two distance measuring sensors so that a collision angle of the obstacle with respect to the vehicle is calculated by the locus of the obstacle resulting from the calculated plurality of positions of the obstacle. Further, by calculating the collision angle of the obstacle with respect to the vehicle, it is possible to predict at what collision angle and at what collision velocity in a direction of the collision angle between the obstacle and the vehicle collide so that a collision state in which the obstacle and the vehicle collide can be predicted beforehand.

A second aspect of the present invention is an obstacle detecting apparatus according to the first aspect, further comprising collision velocity calculating means in which, on the basis of distance information from the two distance measuring sensors, the collision velocity in the direction of the collision angle formed between the vehicle and the obstacle which has been calculated by the collision angle calculating means is calculated.

Accordingly, since collision velocity calculating means calculates a collision velocity in the direction of the collision angle formed between the vehicle and the obstacle which has been calculated by collision angle calculating means on the basis of distance information output from the two distance measuring sensors, the accuracy of the collision velocity thereby increases.

A third aspect of the present invention is a vehicle occupant protecting device using the obstacle detecting apparatus which detects the distance between an obstacle and a vehicle by two distance measuring sensors comprising collision angle calculating means in which a plurality of positions of the obstacle is calculated via triangulation on the basis of distance information from the two distance measuring sensors, and a collision angle, which is formed between the obstacle and the vehicle, is calculated by the locus of the obstacle which is calculated by the calculated plurality of positions of the obstacle, collision velocity calculating means in which, on the basis of distance information from the two distance measuring sensors, the collision velocity in the direction of the collision angle formed between the vehicle and the obstacle which has been calculated by the collision angle calculating means is calculated, a collision sensor for detecting collision acceleration, threshold setting means in which a threshold of the collision acceleration for determining the collision by the collision angle and the collision velocity in the direction of the collision angle, and vehicle occupant protecting means which is operated in a case in which collision acceleration detected by the collision sensor is greater than the threshold set by the threshold setting means.

Accordingly, since the threshold of collision acceleration is changed and set by threshold setting means in accordance with the collision angle and the collision velocity in the direction of the collision angle which have been calculated by the collision angle calculating means and the collision velocity calculating means on the basis of distance information output from the two distance measuring sensors, the threshold of collision acceleration can be set in accordance with the collision state so that the vehicle protecting means can operate at the optimal timing.

A fourth aspect of the present invention is an obstacle detecting apparatus according to the second aspect, wherein the collision velocity calculating means selects a sensor having higher stability from the two distance measuring sensors on the basis of the collision angle detected by the two distance measuring sensors, and calculates the collision velocity in a direction of the collision angle formed between the vehicle and the obstacle by information from the selected distance measuring sensor.

Accordingly, information from a sensor having higher stability in its detection is selected so as to compare such information with each other, the left distance measuring sensor and the right distance measuring sensor. Since the collision velocity in the direction of the collision angle of the obstacle can be calculated on the basis of the selected sensor information, even when a sensor is disposed at the closest distance where sensor information is not stable, the calculating accuracy of the collision velocity in a direction of the collision angle formed between the vehicle and the obstacle is improved.

A fifth aspect of the present invention is a vehicle occupant protecting device according to the third aspect, further comprising operation control means of the vehicle occupant protecting means in which, before a collision, each of the relative velocity in the direction of the collision angle, the collision position and the collision angle is calculated, and on the basis of the calculated results and the rise time of collision acceleration due to the collision sensor, an operating velocity of the vehicle occupant protecting means is controlled.

As a result, since the vehicle protecting means is operated at the operation velocity in accordance with the collision velocity in the direction of the collision angle formed between the vehicle and the obstacle, the collision position, and the collision angle, the vehicle occupant can be protected more effectively by the vehicle protecting means.

BRIEF DESCRIPTION OF THE DRAWINGS

FIG. 1 is a schematic structural view illustrating an obstacle detecting apparatus and a vehicle occupant protecting device using the same relating to a first embodiment of the present invention.

FIG. 3 is a flowchart of the calculation of a current position of an obstacle for the obstacle detecting apparatus and the vehicle occupant protecting device using the same relating to the first embodiment of the present invention.

FIG. 8 is a flowchart of the calculation of a collision velocity for the obstacle detecting apparatus and the vehicle occupant protecting device using the same relating to the first embodiment of the present invention.

FIG. 9 is an explanatory view of a collision velocity for the obstacle detecting apparatus and the vehicle occupant protecting device using the same relating to the first embodiment of the present invention.

FIG. 11 is an explanatory view of a relationship of the collision velocity, the collision angle, and the threshold of collision acceleration for the obstacle detecting apparatus and the vehicle occupant protecting device using the same relating to the first embodiment of the present invention.

FIG. 12 is a flowchart of the determination of a collision for the obstacle detecting apparatus and the vehicle occupant protecting device using the same relating to the first embodiment of the present invention.

FIG. 18 is a table showing which of sensor information to be used from a left sensor and a right sensor is to be used in accordance with the conditions of a collision for the obstacle detecting apparatus and the vehicle occupant protecting device using the same relating to the second embodiment of the present invention.

DESCRIPTION OF THE PREFERRED EMBODIMENTS

An obstacle detecting apparatus and a device for protecting a vehicle occupant using the obstacle detecting apparatus according to a first embodiment of the present invention will be explained with reference to FIGS. 1 through 13.

In these figures, arrow FR points toward the front of a vehicle.

As shown in FIG. 1, in a vehicle 10 of the present embodiment, a right distance measuring sensor (R) 12 and a left distance measuring sensor (L) 14, made of two electrical wave radar sensors are respectively installed in the vicinity of the end portions of a front surface 10A in the transverse direction of the vehicle 10. At the time of a collision occurring at the front of the vehicle 10, the distance and relative velocity between the vehicle 10 and an obstacle 16 are detected on the basis of the values detected by the distance measuring sensors 12, 14.

Figure 2:
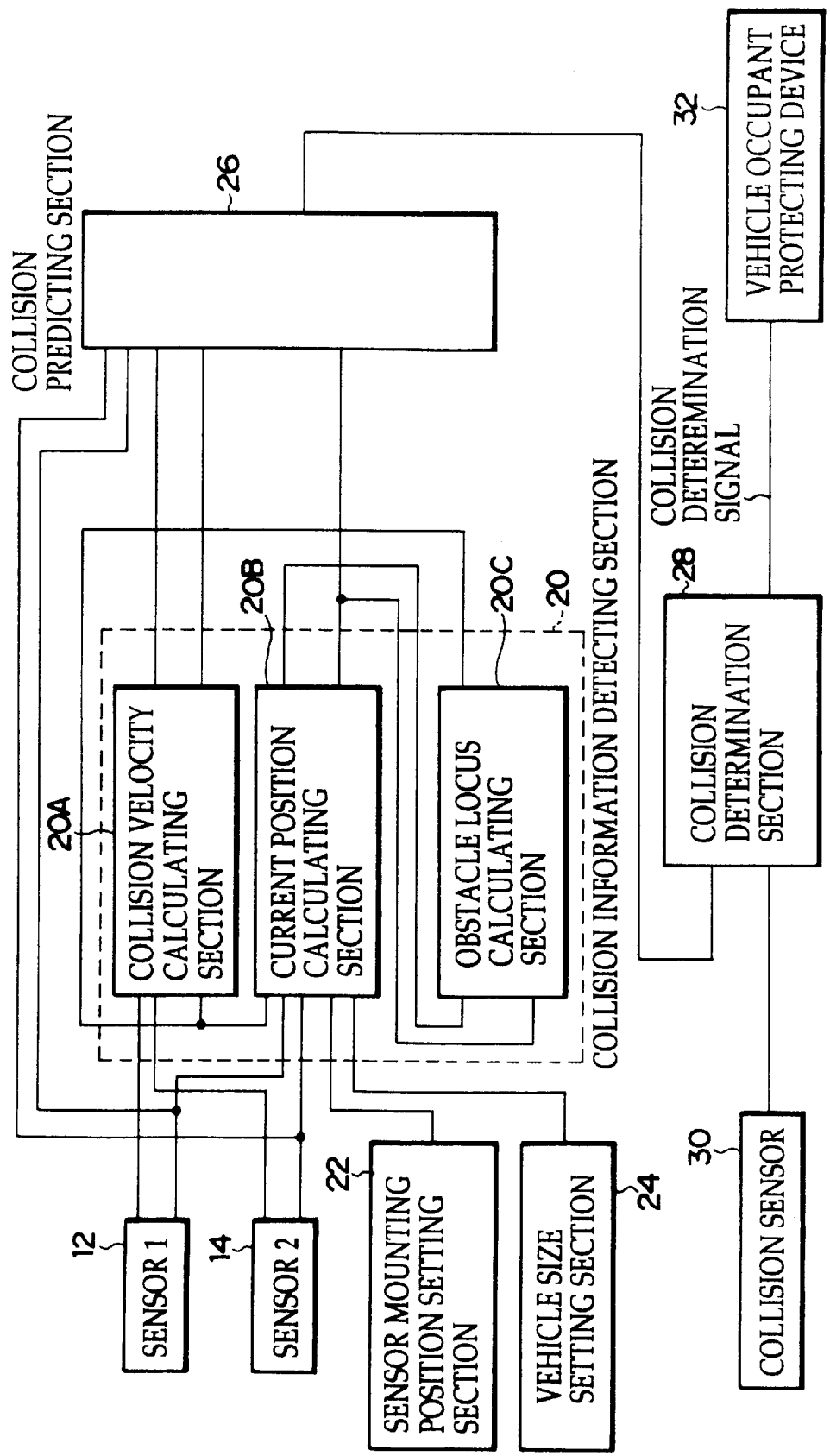
FIG. 2 is a block diagram of the obstacle detecting apparatus and the vehicle occupant protecting device using the same relating to the first embodiment of the present invention.

As shown in FIG. 2, the distance measuring sensors 12, 14 are respectively connected to a collision information detecting section 20. The collision information detecting section 20 is provided to calculate a collision velocity, a collision angle, or the like as detailed information regarding the obstacle 16.

The distance measuring sensors 12, 14 are also connected to a collision velocity calculating section 20A and a current position calculating section 20B which are provided in the collision information detecting section 20. The current position calculating section 20B is connected to a sensor mounting position setting section 22 and a vehicle size setting section 24. The sensor mounting position setting section 22 inputs positions on a vehicle at which the distance measuring sensors 12, 14 are installed, and the vehicle size setting section 24 inputs a vehicle size. Further, the collision information detecting section 20 includes an obstacle locus calculating section 20C therein. The obstacle locus calculating section 20C is connected to the collision velocity calculating section 20A and the current position calculating section 20B.

The distance measuring sensors 12, 14 and the collision information detecting section 20 are connected to a collision predicting section 26. Judging from a collision velocity and a collision angle at a certain distance between the vehicle 10 and the obstacle 16, the collision predicting section 26 predicts the degree of danger of collision so as to construct threshold setting means for setting the operating threshold of a vehicle occupant protecting device.

The collision predicting section 26 is connected to a collision determination section 28 constituting collision determination means. A collision sensor 30, consisting of an acceleration sensor, is also connected to the collision determination section 28. The collision determination section 28 compares collision acceleration G which is output from the collision sensor 30 with a threshold which is set at the collision predicting section 26 at the time of an actual collision, and when the actual collision acceleration exceeds the threshold, the collision determination section 28 outputs a collision determination signal so as to operate a vehicle occupant protecting device 32 such as an air bag apparatus or the like.

An operation of the first embodiment of the present invention will be explained hereinafter.

First of all, a method for calculating the current position of an obstacle will be explained.

Typically, a corner reflector (i.e., a standard reflector) has the characteristic of reflecting an electrical wave at a single reflecting point thereof. However, in the case of an obstacle 16 having a certain width (i.e., a certain magnitude) such as another vehicle or the like, the reflection intensity of the radar is distributed, and a strongly reflecting portion of the reflector can thereby be recognized. As a result, when the distance measuring sensors 12, 14 of two radar sensors detect the obstacle 16, because respective reflecting points from the two radar sensors are different, distances and relative velocities detected by the distance measuring sensors 12, 14 do not correspond with each other, and data, in which even if there is a single obstacle 16, there seem to be two obstacles 16, may be output from the sensors. Actually, since it is rarely necessary to imagine an occasion on which there may be a plurality of obstacles 16 at a close distance such as about 1 m between the vehicle 10 and the obstacle 16, there is no problem of predicting the current position of the obstacle 16 with a certain accuracy by way of triangulation by assuming that there must be one obstacle 16.

Figure 5:
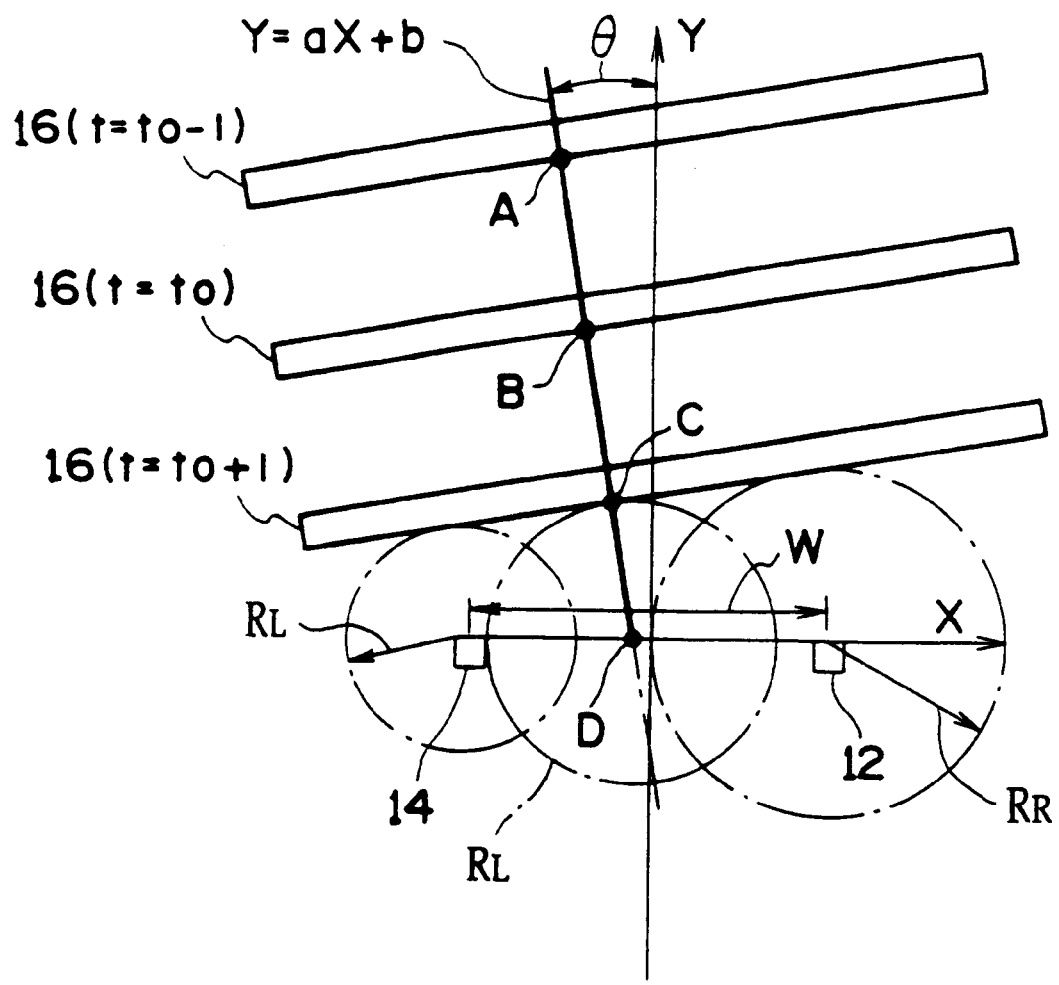
FIG. 5 is an explanatory view of an azimuth angle of an obstacle for the obstacle detecting apparatus and the vehicle occupant protecting device using the same relating to the first embodiment of the present invention.

Therefore, as shown in the flowchart of FIG. 3, at Step 100 (hereinafter, referred to as S100), the collision predicting section 26 reads distance-measured values $R_R$, $R_L$ by the distance measuring sensors (R)12, (L)14. Further, the collision predicting section 26 reads the predicted locus (Y=aX+b) of the obstacle 16 which is shown in FIG. 5 and results from the calculation at the obstacle locus calculating section 20C.

Next, at S102, on the basis of distance information, it is determined whether an intersecting point indicating a position of the obstacle 16 may exist or not. If it is determined that an intersecting point exists at S102, the routine proceeds to S104, where actual distance L of the obstacle 16, which is shown in FIG. 4, is determined by the following equation (1):

$$L = \sqrt{\frac{R_R^2 + R_L^2 - \frac{W^2}{2}}{2}} \quad [m] \tag{1}$$

where the width between the two sensors (in bilateral symmetry) is expressed by W(m).

Figure 4:
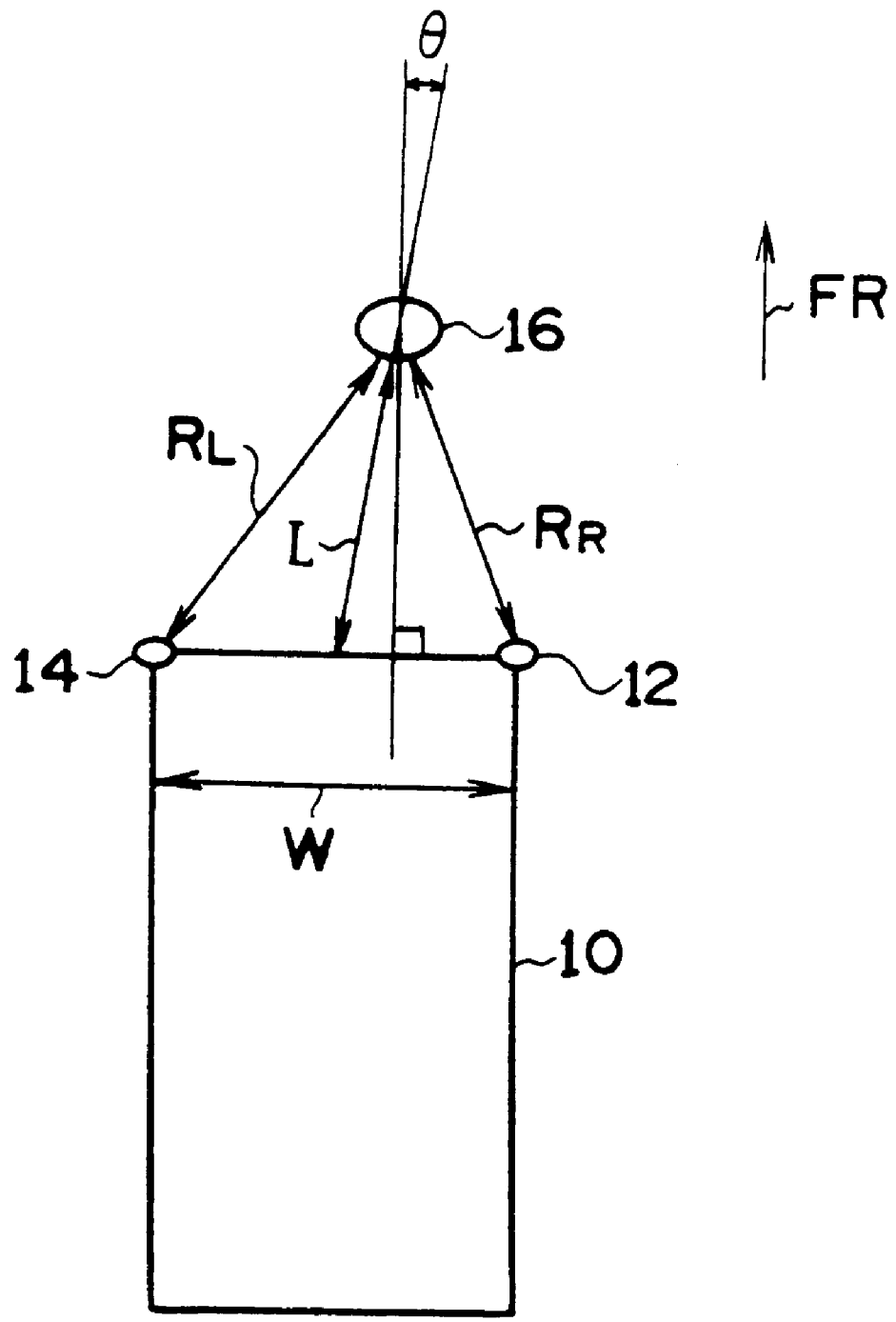
FIG. 4 is an explanatory view of the calculation of a current position of the obstacle for the obstacle detecting apparatus and the vehicle occupant protecting device using the same relating to the first embodiment of the present invention.

At S106, calculation of an azimuth angle θ of the obstacle 16 which is shown in FIG. 4 is put into practice by using the following equation (2):

$$\theta = \cos^{-1}\left[\frac{R_L^2 - R_R^2}{2LW}\right] - 90 \quad [deg] \tag{2}$$

Otherwise, at S102, in a case where it has been determined that there is no intersecting point, the routine proceeds to S108, where the mean value of distance measured values $R_R$, $R_L$ of the distance measuring sensors (R)12, (L)14 is employed as actual distance L. At S110, azimuth angle θ is calculated from gradient a of a linear equation of the predicted locus of the obstacle 16.

Accordingly, as shown in FIG. 5, in the detection of the obstacle 16 having a certain width (i.e., a certain magnitude) such as a guard rail, a concrete wall, and the like, when the distance between the obstacle 16 and the distance measuring sensors 12, 14 is less than or equal to about half of the width (W) between the two distance measuring sensors 12, 14 (a point where $t=t_{0+1}$), an insertion point indicating a position of the obstacle 16 is nonexistent so that the current position and an azimuth cannot be calculated. Therefore, a current position of the obstacle 16 is predicted by the locus of the obstacle (Y=aX+b) which is determined from intersecting point A (a point where $t=t_{0-1}$) and an intersecting point B (a point where $t=t_0$), indicating positions of the obstacle 16 in a region where the obstacle 16 is apart from the sensors at a certain distance, and current distance measuring data ($R_R$, $R_L$).

It is presumed that an intersecting point (i.e., an predicted collision position) of linear line (Y=aX+b) and X axis is D, intersecting point D is used as a center point of circle R1 having radius (($R_R+R_L$)/2), and intersecting point C of circle R1 and linear line (Y=aX+b) is a position of the obstacle 16 at the time where ($t=t_{0+1}$). Because the azimuth of the obstacle 16 rarely changes for such a short period of time, the locus of the obstacle 16 is not displaced largely from linear equation Y=aX+b. Further, on the basis of distance measured data or values ($R_R$, $R_L$) of the two distance measuring sensors 12, 14, the shortest distance between the obstacle 16 and the two distance measuring sensors 12, 14 is detected by a signal process (which is the obstacle 16 having a substantially even distribution of reflection intensity). When a mean value of the results of distance measurements by the two sensors 12,14 is employed, the actual position of the obstacle 16 and intersecting point C correspond with each other with high accuracy.

Next, a method for calculating the locus of the obstacle will be explained hereinafter.

Figure 6:
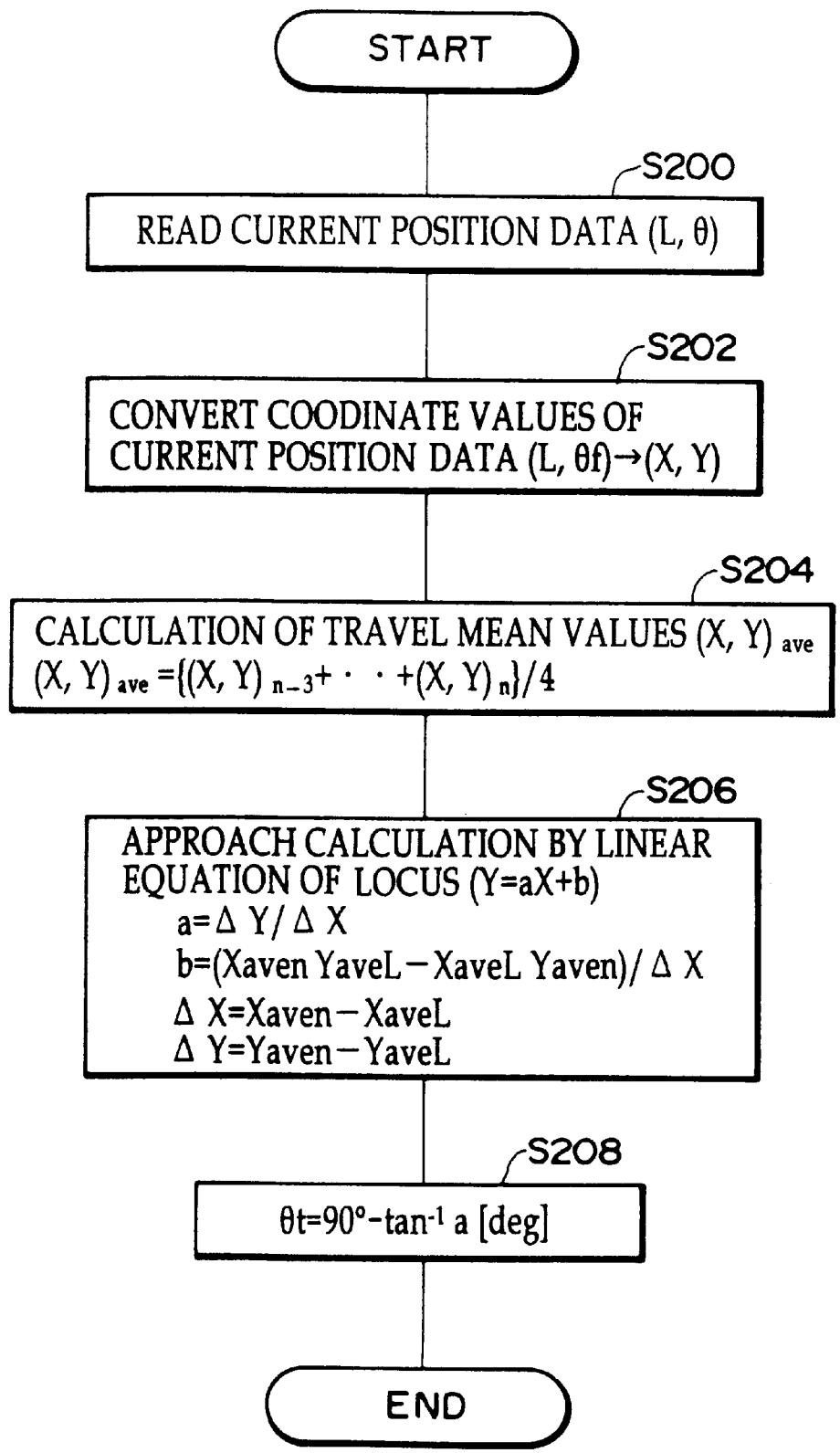
FIG. 6 is a flowchart of the calculation of the locus of an obstacle for the obstacle detecting apparatus and the vehicle occupant protecting device using the same relating to the first embodiment of the present invention.
Figure 7:
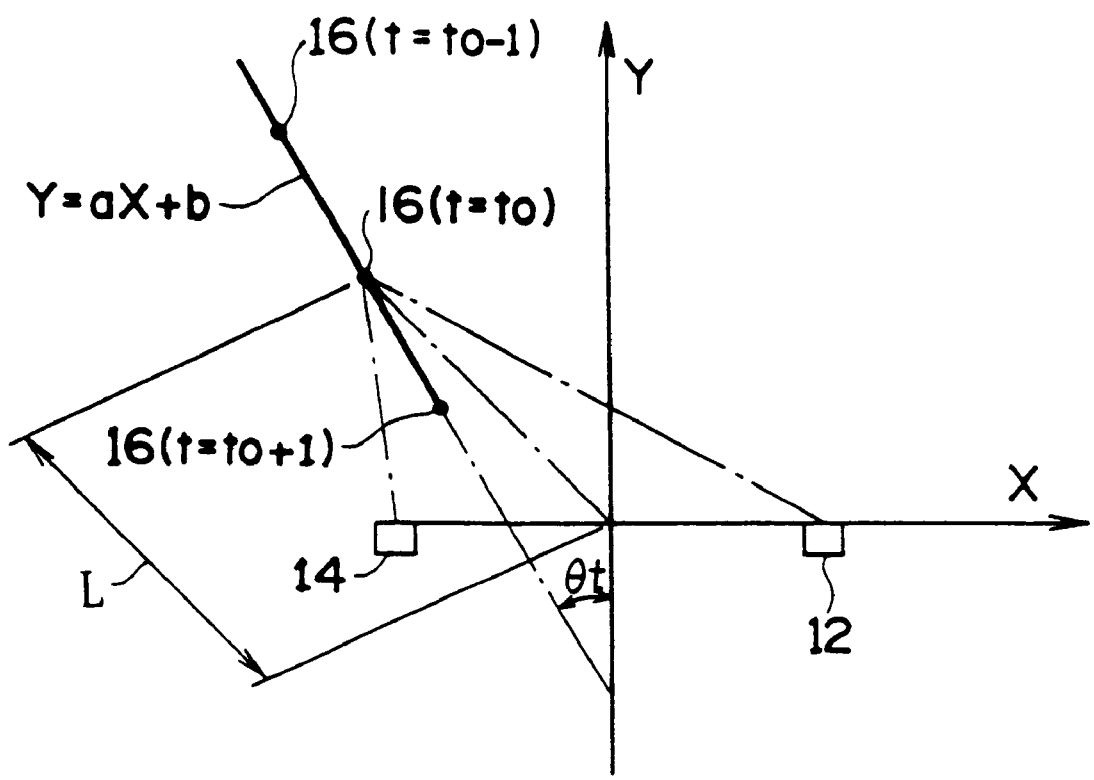
FIG. 7 is an explanatory view of a traveling locus of an obstacle for the obstacle detecting apparatus and the vehicle occupant protecting device using the same relating to the first embodiment of the present invention.

As shown in the flowchart in FIG. 6, at S200, at the obstacle locus calculating section 20C, the current position data (L, θ) calculated at the current position calculating section 20B is read. At S202, a polar coordinate system is converted into an orthogonal coordinate system. At S204, traveling mean values $(X, Y)_{aven}$ are calculated at four points in order to prevent the locus of the obstacle 16 from being affected by noise. At S206, linear equation (Y=aX+b) of the locus shown in FIG. 7 is calculated from traveling mean values ((XaveL, YaveL), (Xaven, Y aven)) within the range in which an approaching locus of the obstacle 16 does not change largely (i.e., within the range less than or equal to 10 cm at maximum), and at S208, azimuth angle θt is determined from gradient a of linear equation (Y=aX+b).

The calculating method of a collision velocity will be explained hereinafter.

In an electrical wave radar sensor using an electrical wave, relative velocities between an irradiated portion of the obstacle 16 and the sensors can be measured by measuring the difference in frequency (i.e., Doppler frequency) between a transmitting wave and a receiving wave through the Doppler effect. When a vector of the relative velocity is in the same direction as that of beam radiation, the relative velocity corresponds to the velocity of the obstacle 16 approaching the vehicle 10. However, in the case that the vector of the relative velocity is not in the same direction as that of the beam radiation, because the relative velocities detected by the distance measuring sensors 12, 14 become cos components of the actual velocity of the obstacle 16 approaching the vehicle 10, due to the collision angle formed between the vehicle and the obstacle, not a few errors may be caused.

As shown in the flowchart in FIG. 8, in the collision information detecting section 20, at S300, the detected relative velocities $V_R$, $V_L$ by the two distance measuring sensors 12, 14, and azimuth angle θt resulting from the collision predicting section 26 are read. At S302, collision velocity $V_L$ is determined from the relative velocity $V_R$ at the sensor (R)12 side, while collision velocity V2 is determined from relative velocity $V_L$ at the sensor (L) 14 side.

At S304, if the absolute value of the difference between V1 and V2 is less than velocity range ΔV, the routine proceeds to S306, where collision velocity V adopts the mean value of V1 and V2. On the other hand, at S304, if the absolute value of the difference between V1 and V2 is greater than velocity range ΔV, the routine proceeds to S308, where the magnitudes of angles (90−θt−θR) and (90+θt−θL) in the cos terms of an equation for calculating the collision velocities V1, V2 are compared to each other. The above equation is calculated by angles θR, θL between the distance measuring sensors 12, 14 and the obstacle 16. If angle (90+θt−θL) is greater than angle (90−θt−θR), the routine proceeds to S310, where V1 is used as the collision velocity. On the other hand, if angle (90−θt−θR) is greater than angle (90+θt−θL), the routine proceeds to S312, where V2 is used as the collision velocity.

As shown in FIG. 9, in a region where each of the magnitudes of angles (90−θt−θR) and (90+θt−θL) in the cos terms of the aforementioned equation for calculating collision velocities V1, V2 is close to 0°, the collision velocity is slightly affected by the errors of the angles θR, θL and θt. On the other hand, in a region where each of magnitudes of the aforementioned angles (90−θt−θR) and (90+θt−θL) is close to 90°, the collision velocity is affected largely by the errors of angles θR, θL, and θt. Therefore, if the collision velocity having a smaller angle is employed, the collision velocity with higher accuracy can be detected.

At S314, the azimuth angle θt resulting from the locus of the obstacle 16 is used as collision angle θv.

Next, a method for predicting the collision of a vehicle will be explained hereinafter.

Figure 10:
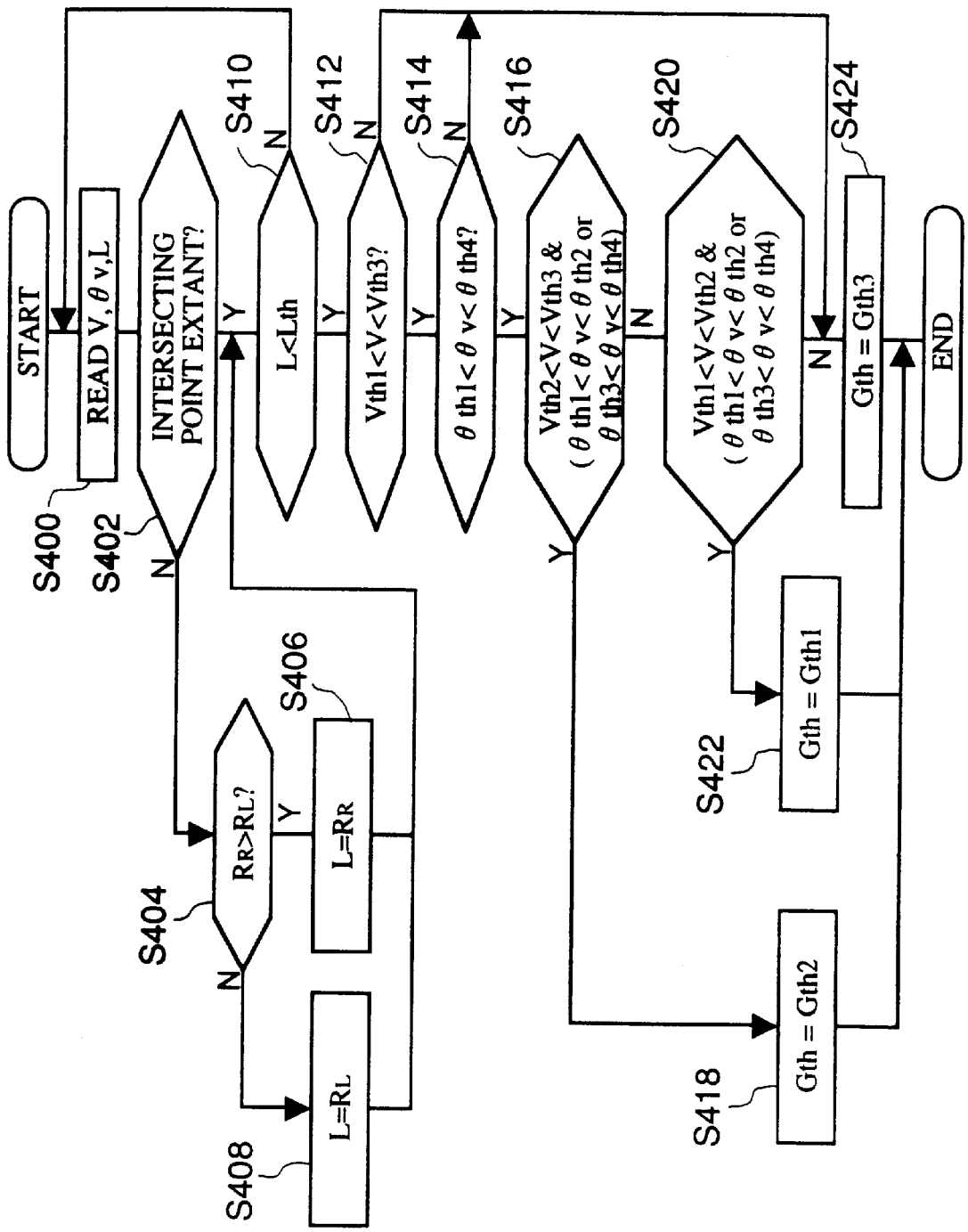
FIG. 10 is a flowchart of the calculation of a threshold of collision acceleration for the obstacle detecting apparatus and the vehicle occupant protecting device using the same relating to the first embodiment of the present invention.
Figure 13:
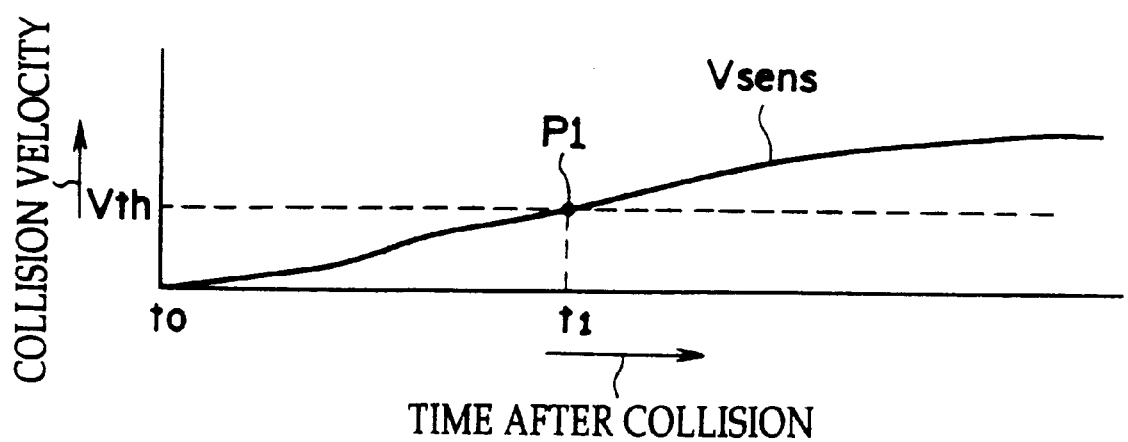
FIG. 13 is an explanatory view of the determination of the collision for the obstacle detecting apparatus and the vehicle occupant protecting device using the same relating to the first embodiment of the present invention.

As shown in the flowchart in FIG. 10, in the collision predicting section 26, threshold Gth of collision acceleration for determining the expansion timing of an air bag as the vehicle occupant protecting device 32 can be determined by collision velocity V, collision angle θv, actual distance L between the obstacle 16 and the vehicle 10, and detected distances $R_R$, $R_L$ by the two distance measuring sensors 12, 14.

Namely, at S400, collision velocity V, collision angle θv, actual distance L, and the detected distances $R_R$, $R_L$ by the two distance measuring sensors 12, 14 are read. At S402, it is determined whether or not the distances $R_R$, $R_L$ detected by the two distance measuring sensors 12, 14 have an intersecting point at the shortest distance between the obstacle 16 and the sensors 12, 14 (i.e., at a distance which is less than or equal to half the width between sensors 12, 14). When detected distances $R_R$, $R_L$ have an intersecting point, the routine proceeds to S410. When detected distances $R_R$, $R_L$ have no intersecting point at S402, it means that the obstacle 16 has a certain magnitude or width. In this case, at S404, distances $R_R$ and $R_L$ detected by the sensors 12, 14 are compared to each other. When distance $R_L$ is smaller than distance $R_R$, at S406, the distance $R_R$ having larger distance measuring data from sensors 12, 14 is used as an actual distance L. On the other hand, when distance $R_L$ is equal to or larger than distance $R_R$, at S408, distance $R_L$ having larger measuring data from the sensors 12, 14 is used as an actual distance L.

At S410, the routine is iterated from steps S400 through S408 until actual distance L becomes shorter than fixed distance Lth. If actual distance L becomes shorter than fixed distance Lth, at S412, a determination is made whether collision velocity V is between Vth1 and Vth3. If the answer is "YES" at S412, the routine proceeds to S414, where a determination is made whether collision angle θv is between θth1 and θth4. If the answer is "YES" at S414, the routine proceeds to S416, where a determination is made whether collision angle θv is in region 1, which is shown in FIG. 11. If the answer is "YES" at S416, the routine proceeds to S418, where Gth2 is set to threshold Gth of collision acceleration.

If the answer is "NO" at S416, the routine proceeds to S420, where a determination is made whether collision velocity V and collision angle θv are in region 2, which is also shown in FIG. 11. If the answer is affirmative at S420, the routine proceeds to S422, where Gth1 is set to threshold Gth of collision acceleration.

If the answer is negative at S420, the routine proceeds to S424, where Gth3 is set to threshold Gth of collision acceleration.

Namely, when the obstacle 16 is provided at distance Lth in which a collision cannot be prevented, a large collision acceleration is generated within the range in which collision angle θv is close to 0°, and Gth3 is thereby set to regular threshold Gth. Meanwhile, when the collision angle θv becomes larger (30° or greater in a transverse direction of the obstacle 16 at the time of a collision at the front of the vehicle), the magnitude and the rise time of collision acceleration are affected so that sensors tend to be delayed. Accordingly, as shown in FIG. 10, when collision angle θv is in a region (θth1 to θth2, θth3 to θth4) and collision velocity V is relatively small (Vth1 to Vth2), Gth1 is used as threshold Gth of collision acceleration. In the case that the collision angle θv is within the same range as aforementioned collision angle θv, and collision velocity V is within the range of (Vth2 to Vth3), Gth2 is used as threshold Gth of collision acceleration. Further, threshold Gth of three collision accelerations has a relationship of magnitude of Gth3>Gth2>Gth1.

Next, a method of determining a collision will be explained hereinafter.

In the collision determination section 28, as shown in the flowchart in FIG. 12, at S500, detected value Gsens of the collision acceleration by the collision sensor 30, and calculated threshold Gth of the collision acceleration at the collision predicting section 26 are read. At S502, value Vsens is calculated by integrating detected value Gsens of the collision acceleration with times $t_0$ to $t_1$. At S504, time integration value Vth of threshold Gth of collision acceleration determined at the collision predicting section 26 is calculated, and the routine proceeds to S506.

At S506, a determination is made whether Vsens is greater than Vth. As indicated by point P1 in FIG. 13, if Vsens is greater than Vth, at S508, it is determined that a collision has occurred and a collision determination signal (an enable signal to operate the air bag apparatus) is output to the air bag apparatus serving as the vehicle occupant protecting device 32 so as to enable the air bag apparatus to operate (or to operate the air bag apparatus). On the other hand, at S506, if it is determined that Vsens is less than Vth, at S510, it is determined that a collision has not occurred and a collision determination signal (i.e., a disable signal to operate an air bag apparatus) is output to the air bag apparatus serving as the vehicle occupant protecting device 32 so as to prevent the air bag apparatus from operating.

Accordingly, in the present embodiment, collision information (i.e., relative velocities, distances, and directions) are calculated accurately at the collision information calculating section 20 by using the two distance measuring sensors 12, 14, which can simultaneously detect a plurality of relative velocities and distances between the sensors and the obstacle. Further, at the collision predicting section 26, the optimal value of threshold Gth of collision acceleration at which the air bag apparatus serving as the vehicle occupant protecting device 32 is operated in accordance with the state of the collision is determined from the collision angle and the collision velocity. For this reason, even when the detected acceleration of the collision sensor 30 is small, the air bag apparatus serving as the vehicle occupant protecting device 32 can expand at an optimal timing.

Figure 14:
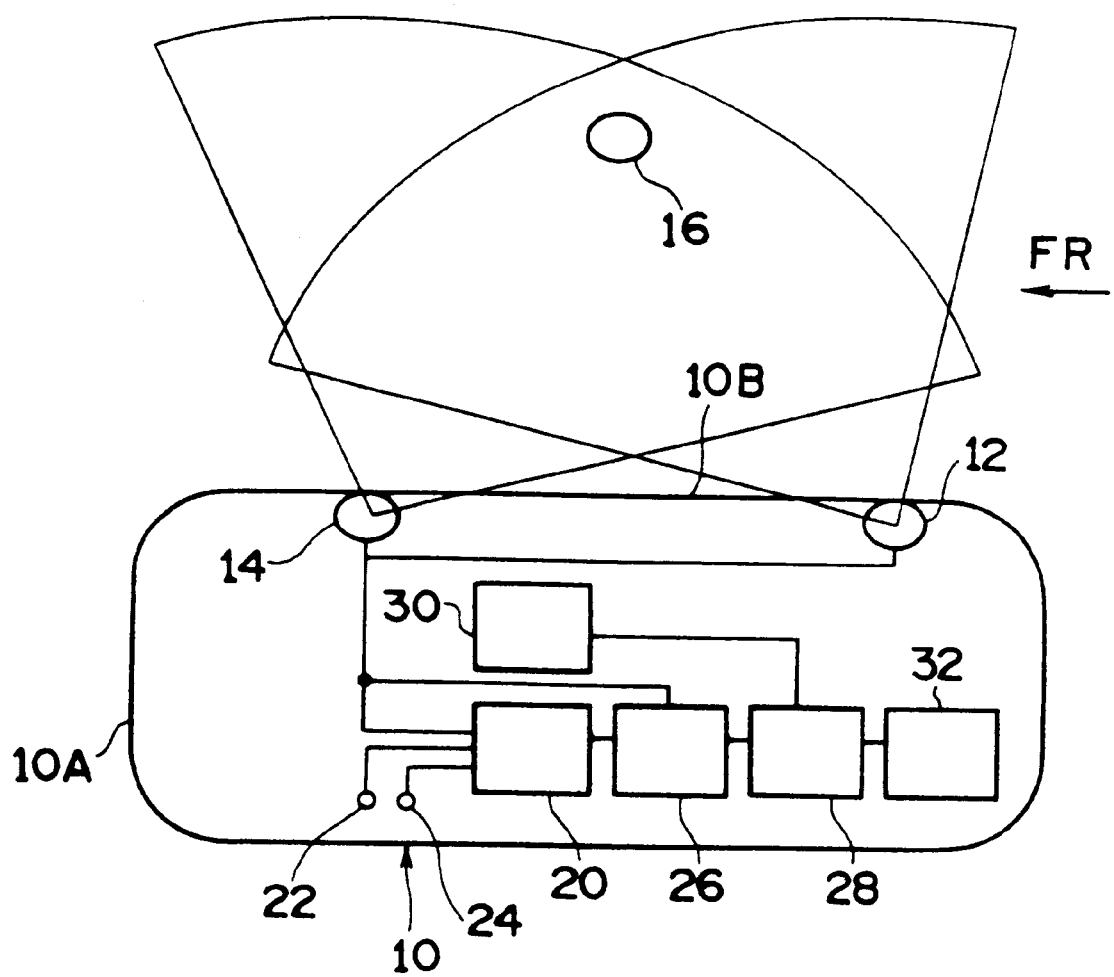
FIG. 14 is a schematic structural view of an obstacle detecting apparatus and a vehicle occupant protecting device using the same relating to an example of a variation upon the first embodiment of the present invention.

As shown in FIG. 14, the present embodiment can be structured such that the two distance measuring sensors 12, 14 are mounted in the vicinity of each of the end portions of the vehicle 10 in the longitudinal direction thereof, respectively, and distances and relative velocities between the vehicle 10 and the obstacle 16 are detected at the time of a collision at the side of the vehicle 10.

An obstacle detecting apparatus and a device for protecting a vehicle occupant using the obstacle detecting apparatus according to a second embodiment of the present invention will be explained hereinafter with reference to FIGS. 15 through 20.

The structure of the second embodiment is the same as the first embodiment, and a description thereof is omitted. Instead, a description of the operation thereof will be given hereinafter.

Figure 15:
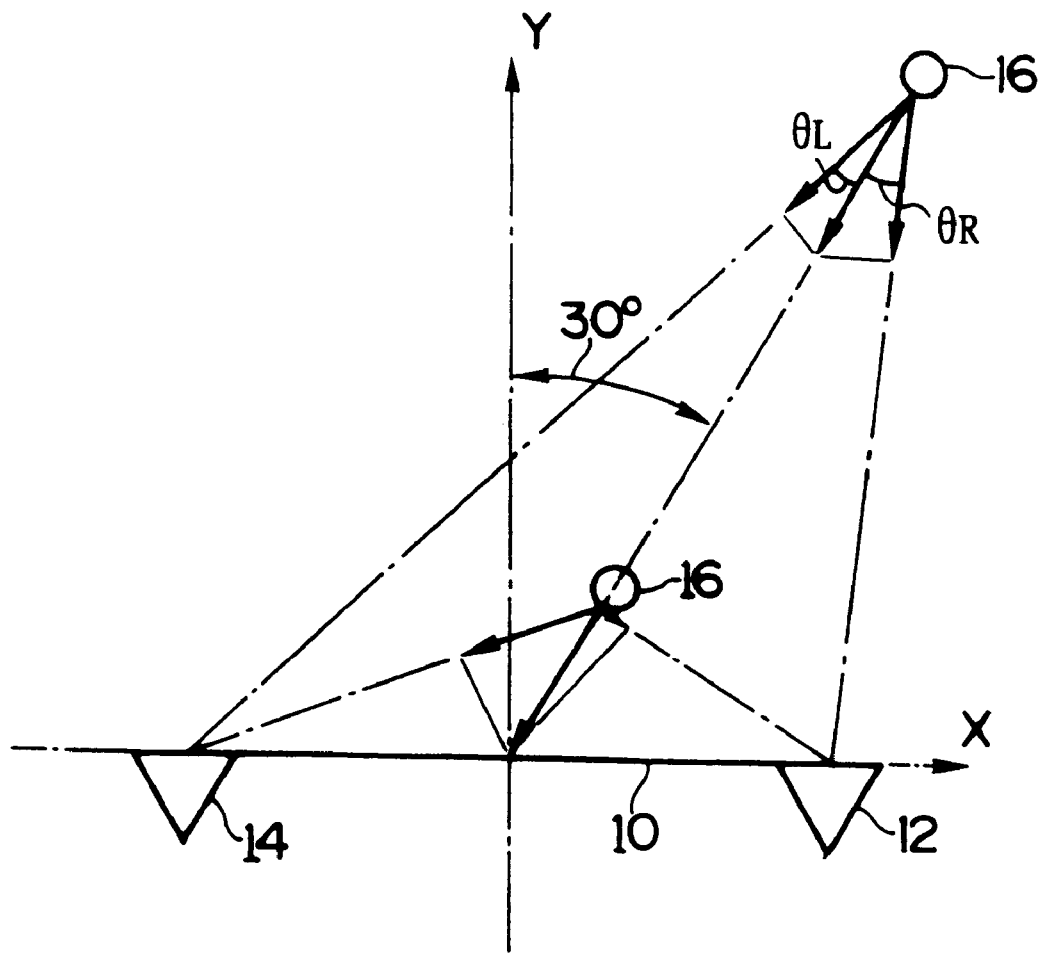
FIG. 15 is an explanatory view of the calculation of a collision velocity for an obstacle detecting apparatus and a vehicle occupant protecting device using the same relating to a second embodiment of the present invention.
Figure 16:
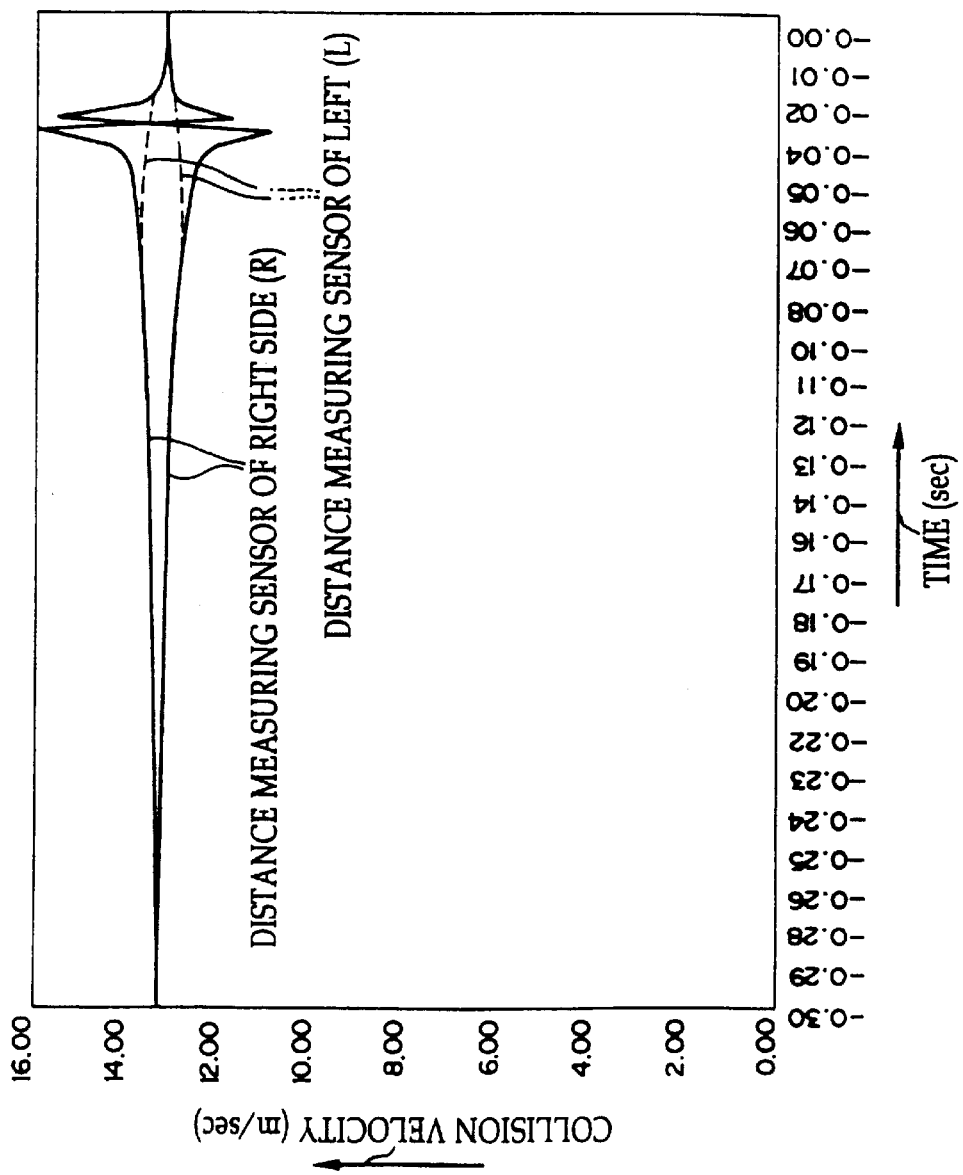
FIG. 16 is a graph of a relationship between the results of calculation of a collision velocity and the time period preceding a collision for the obstacle detecting apparatus and the vehicle occupant protecting device using the same relating to the second embodiment of the present invention.

As shown in FIG. 15, when the obstacle 16 and the vehicle 10 collide from a direction diagonally right of the vehicle 10 so as to be angled at 30°, the relationship between the collision velocity which is detected by the two distance measuring sensors 12, 14, and time is illustrated in FIG. 16, where the vertical axis is the collision velocity and the horizontal axis is the time, and the time 0 sec is the instant of the collision.

In this graph, a solid line indicates the collision velocity which is dcalculated from the relative velocity detected by the right (R) distance measuring sensor 12. A broken line indicates the collision velocity which is calculated from the relative velocity detected by the left (L) distance measuring sensor 14. Further, two collision velocities respectively provided for each of the two distance measuring sensors 12, 14 are values of the respective collision velocities which are calculated at the time when the distance detecting accuracy of each sensor varies at ±15 cm, and means that, depending upon variations in the detected distance, the calculated values of the collision velocities vary between the two curves.

As shown in FIG. 16, in the collision velocity which is determined from the detected relative velocity by the right (R) distance measuring sensor 12, the calculation error becomes larger at the shortest distance between the vehicle 10 and the obstacle 16 at a time of 0.04 sec before the collision (i.e., about 10 cm closer from the vehicle 10 to the obstacle 16). Especially, the relative velocity detected by the right (R) distance measuring sensor 12 (cos components of the collision velocity) decreases as the obstacle 16 comes closer to the vehicle 10, and when the obstacle 16 becomes more closer to the vehicle 10, a state in which polarity may be reversed, is generated. The reason why this happens is that collision velocity V is determined by V=VR/cos θR, but when θR is about 90°, the value of cos θR is extremely small, the collision velocity V is affected greatly by the calculating error in θR.

Moreover, in the general state of a collision, because the change of the collision velocity is rarely caused in such an extremely short period of time as a few 10 msec, it is possible to predict the collision velocity at the instant of collision to a degree by detecting the collision velocity at a time of a few 10 msec before the collision. However, in the actual collision of a vehicle, the vehicle 10 according to the present invention, or the other vehicle with which the vehicle 10 collides, may induce a multiple collision with other obstacles than the aforementioned other vehicle before the actual collision. In a multiple collision, when the other vehicle and another objects collide directly after the vehicle 10 has determined the collision velocity of the vehicle 10 with respect to the other vehicle, the actual collision velocity changes drastically. For this reason, in order to predict the collision velocity accurately, changes in the velocity must be checked as minutely as possible by the last moment before the collision.

Figure 17:
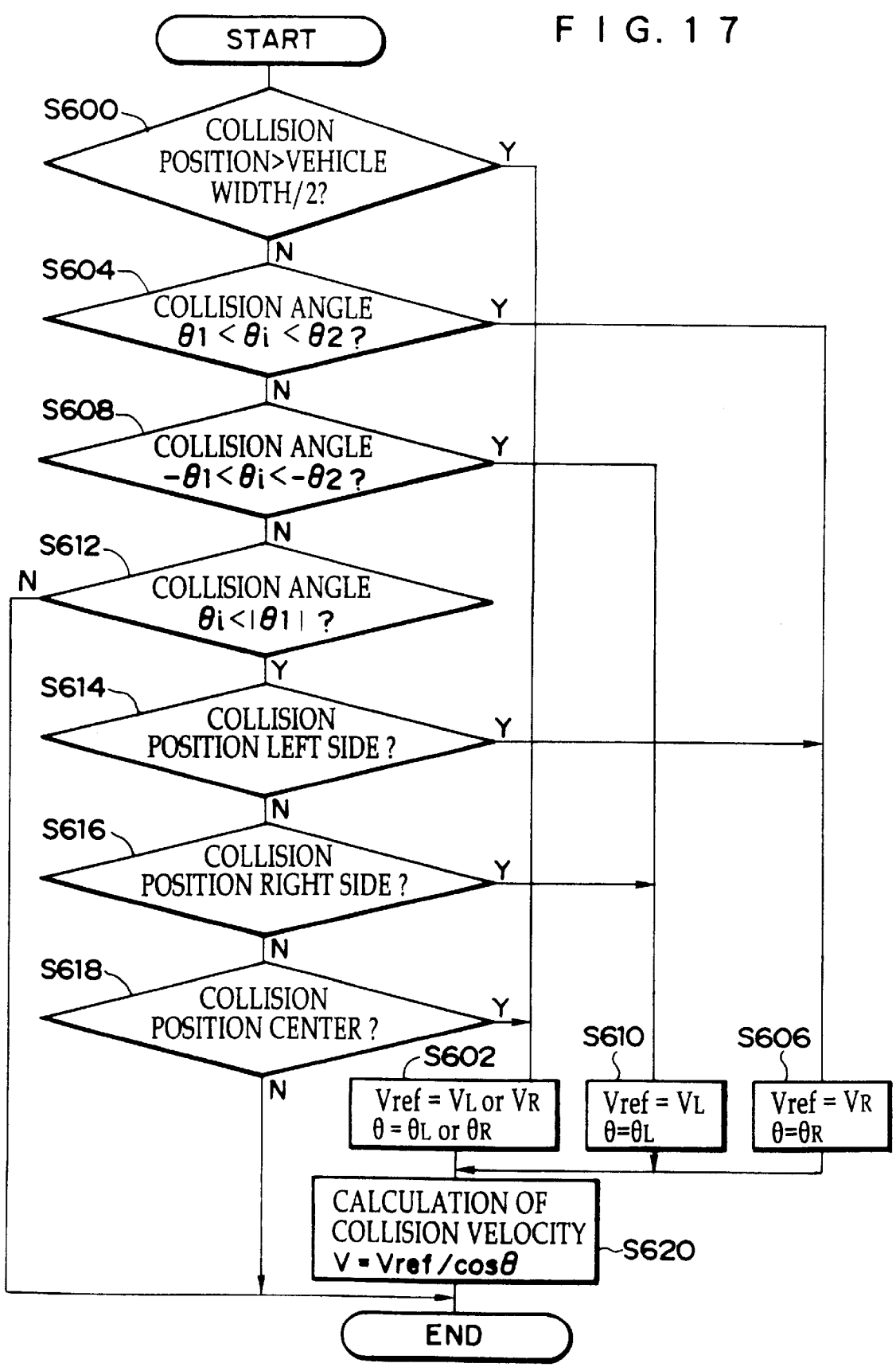
FIG. 17 is a flowchart of the calculation of a collision velocity for the obstacle detecting apparatus and the vehicle occupant protecting device using the same relating to the second embodiment of the present invention.

Therefore, in the collision predicting section 26 of the present embodiment, as shown in the flowchart in FIG. 17, at S600, a determination is made whether the intersecting point of the linear line Y=aX+b and X axis, i.e., predicted collision position D which is shown in FIG. 5, is disposed at the position at which the distance from position D to the center of the widthwise direction of the vehicle 10 is larger than W/2 (i.e., W is the distance between the two sensors 12, 14 which are symmetrical to each other). Namely, a determination is made whether predicted collision position D is disposed out of W/2, i.e., a central point of the vehicle at the transverse direction thereof (in this case, as shown in FIG. 5, W/2 is the distance from the central point of W to the right (R) distance measuring sensor 12).

At S600, if it is determined that predicted collision position D is disposed at a position at which the distance from the position D to the center of the widthwise direction of the vehicle 10 is larger than W/2 (i.e., W is the distance between the two sensors 12, 14 which are symmetrical to each other), the routine proceeds to S602. In this case (i.e., in FIG. 5), since predicted collision position D is disposed at a position further to the distance W/2 from the center point of the transverse direction of the vehicle 10, the relative velocities between the sensors and the obstacle 16 are difficult to produce. Further, the obstacle 16 and the vehicle 10 collide from a direction of the sensor having a lower sensitivity so that it becomes difficult to effect stable detection by using the two distance measuring sensors 12, 14. In this case, it is desirable to compare information from the left and right distance measuring sensors 12, 14 to each other and to employ only information from the sensor which is detecting the relative velocity more stably. Namely, relative velocity $V_R$ or $V_L$, i.e., the information which the distance measuring sensor 12 or 14 is detecting more stably is set to relative velocity Vref so that the collision velocity is calculated. At the same time, the angle $\theta_R$ or $\theta_L$, each of which is formed between the obstacle 16 and the distance measuring sensors 12, 14, i.e., the information of which the distance measuring sensor 12 or 14 is detecting with more stability, is set to angle $\theta$.

On the other hand, at S600, if it is determined that predicted collision position D is disposed at a position at which the distance from the position D to the center of the widthwise direction of the vehicle 10 is less than or equal to W/2 (i.e., W is the distance between the two sensors 12, 14 which are symmetrical to each other), the routine proceeds to S604, where a determination is made whether collision angle $\theta_i$ is between $\theta_1$ (for example, 5°) and $\theta_2$ (for example, 30°). If the answer is "YES" (i.e., if it is determined that the collision occurs from a diagonally left direction of the vehicle), the routine proceeds to S606, where information $V_R$, $\theta_R$ from the right distance measuring sensor 12 is set to relative velocity Vref and angle $\theta$ for calculating the collision velocity.

On the other hand, at S604, if it is determined that the collision angle $\theta_i$ is not between $\theta_1$ (for example, 5°) and $\theta_2$ (for example, 30°), the routine proceeds to S608, where a determination is made whether the collision angle $\theta_i$ is between $-\theta_1$ (for example, −5°) and $-\theta_2$ (for example, −30°). At S608, if the answer is "YES" (i.e., the collision occurs from a direction diagonally right of the vehicle), the routine proceeds to S610, where information $V_L$, $\theta_L$ from the left distance measuring sensor 14 are set to relative velocity Vref and angle $\theta$ for calculating the collision velocity.

At S608, if the answer is "NO", the routine proceeds to S612, where a determination is made whether the collision angle $\theta_i$ is within the range of $\theta_i < |\theta_1|(\theta_1 = \pm < 5°)$. If the answer is "YES", the routine proceeds to S614, where a determination is made whether the collision predicted position D is positioned at the left side of the vehicle front portion.

At S614, if the answer is affirmative, collision angle $\theta_i$ is relatively small and the obstacle and the vehicle collide at the left side of the vehicle front portion so that it is regarded as an offset collision. Therefore, the routine proceeds to S606, where information $V_R$, $\theta_R$ from the right distance measuring sensor 14 are set to relative velocity Vref and angle $\theta$ for calculating the collision velocity.

Further, at S614, if the answer is negative, the routine proceeds to S616, where a determination is made whether predicted collision position D is positioned at the right side of the vehicle front portion.

At S616, if the answer is "YES", the collision angle $\theta_i$ is relatively small and the obstacle and the vehicle collide at the right side of the vehicle front portion so that it is regarded as an offset collision. Therefore, the routine proceeds to S610, where information $V_L$, $\theta_L$ from the left distance measuring sensor 14 are set to relative velocity Vref and angle $\theta$ for calculating the collision velocity.

Meanwhile, at S616, if the answer is "NO", the routine proceeds to S618, where a determination is made whether the collision predicted position D is positioned at the center of the vehicle front portion.

At S618, if the answer is "YES", the collision angle $\theta_i$ is relatively small and the obstacle and the vehicle collide at the center of the vehicle front portion so that it is regarded as a head-on collision in which the errors detected by the two (left and right) distance measuring sensors 12, 14 have substantially the same level. Therefore, the routine proceeds to S602, where the relative velocity $V_L$ or $V_R$ detected by the distance measuring sensors is set to the relative velocity Vref, while angle $\theta_R$ or $\theta_L$, which is formed between the obstacle 16 and the sensors 12, 14, is set to angle $\theta$.

Following the steps of S602, S606, and S610, at S620, collision velocity V is calculated by relative velocity Vref and angle $\theta$ which have been set on the basis of the collision angle and the collision position.

Accordingly, in the present second embodiment, as shown in a table of FIG. 18, on the basis of conditions for a collision (including the collision angle and the collision position), it is determined which information from the right or left sensor to be used. Since collision velocity V is calculated on the basis of the selected information, even when the obstacle 16 is close to the vehicle 10, the collision velocity V can be calculated accurately.

Next, a description of control of the expansion of the air bag apparatus serving as the vehicle occupant protecting device 32, using the collision velocity according to the present embodiment.

A control portion of the expansion of the air bag apparatus is provided at the collision determination section 28, for detecting the collision velocity, the collision position and the collision angle of the obstacle 16 before the collision, for predicting the degree of damage due to the collision within a few msec directly after the collision by using the collision acceleration detected by the collision sensor 30 which is installed in the vehicle 10, and for optimally regulating the expansion velocity and the inner pressure of the air bag body. In order to directly detect the damage due to the collision, both of the mass and the collision velocity of the obstacle 16 must be detected. However, the mass of the obstacle 16 cannot be detected by the right and left distance measuring sensors 12, 14.

Figure 19:
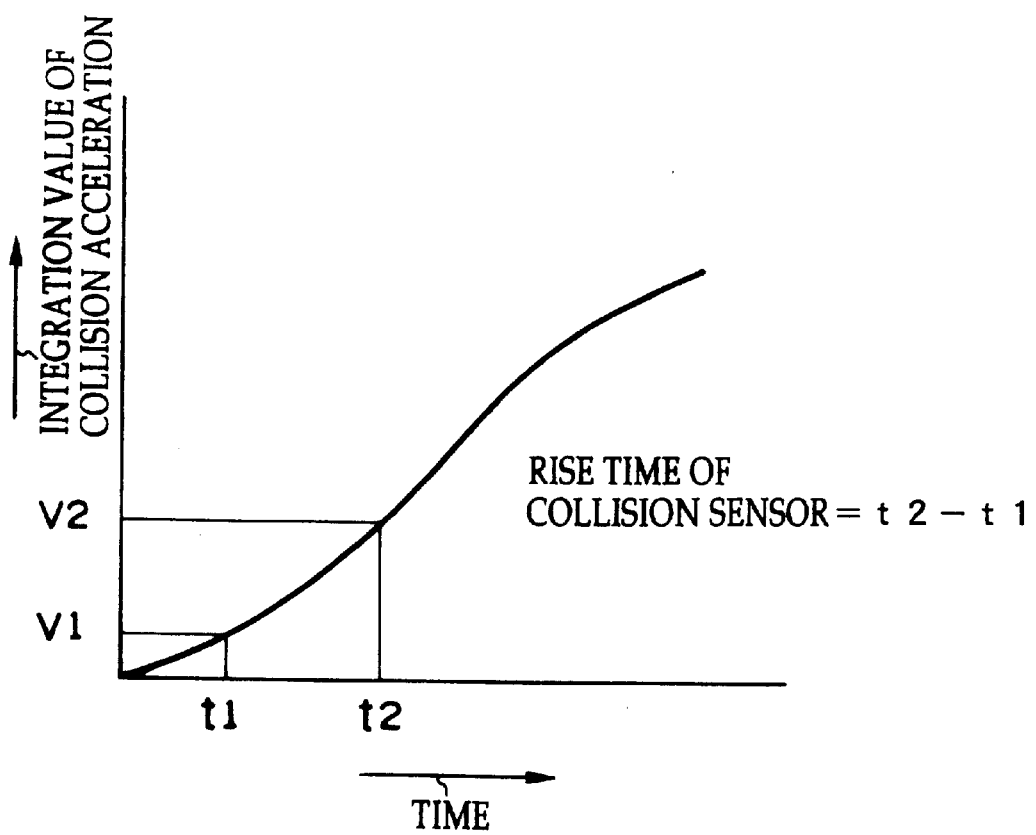
FIG. 19 is a graph of the rise time of a collision sensor.

For this reason, four pieces of information resulting from the present second embodiment are shown in tables 1 through 4 below. As shown in FIG. 19, these four pieces of information include the times at which integration value V of collision acceleration G output from the collision sensor 30 varies from V1 to V2, i.e., different point numbers ai, bi, ci, and di will be given in accordance with the influence degree due to the collision damage for each of the levels consisted of:

rise time of the collision sensor=$t_2-t_1$ (weighting coefficient Ct), collision velocity (weighting coefficient Cv), collision angle (weighting coefficient Ca), and collision position (weighting coefficient Cp).

TABLE 1

| Rise time of collision sensor (ms) | >10 | 8–10 | 6–8 | 4–6 | 2–4 | <2 |
|---|---|---|---|---|---|---|
| Number of points | a1 | a2 | a3 | a4 | a5 | a6 |

TABLE 2

| Collision rate (km/h) | <10 | 10–20 | 20–30 | 30–40 | 40–50 | 50–60 | >60 |
|---|---|---|---|---|---|---|---|
| Number of points | b1 | b2 | b3 | b4 | b5 | b6 | b7 |

TABLE 3

| Collision angle (deg) | >±30 | ±20–30 | ±10–20 | <±10 |
|---|---|---|---|---|
| Number of points | c1 | c2 | c3 | c4 |

TABLE 4

| Collision position | Center | Right side | Left side |
|---|---|---|---|
| Number of points | d1 | d2 | d3 |

For example, performance index Sb is determined by the following equation (3) at the time when the vehicle 10 and a barrier collide on a head-on collision at the velocity of V(km/h).

$$Sb = Ct \cdot ai + Cv \cdot bi + Ca \cdot ci + Cp \cdot di \quad (3)$$

At the time of the actual collision, the evaluation index Si can be calculated in the same manner as the aforementioned index Sb, and ratio α of Si and Sb which has been calculated previously is calculated by the following equation (4).

$$\alpha = Si/Sb \quad (4)$$

Figure 20:
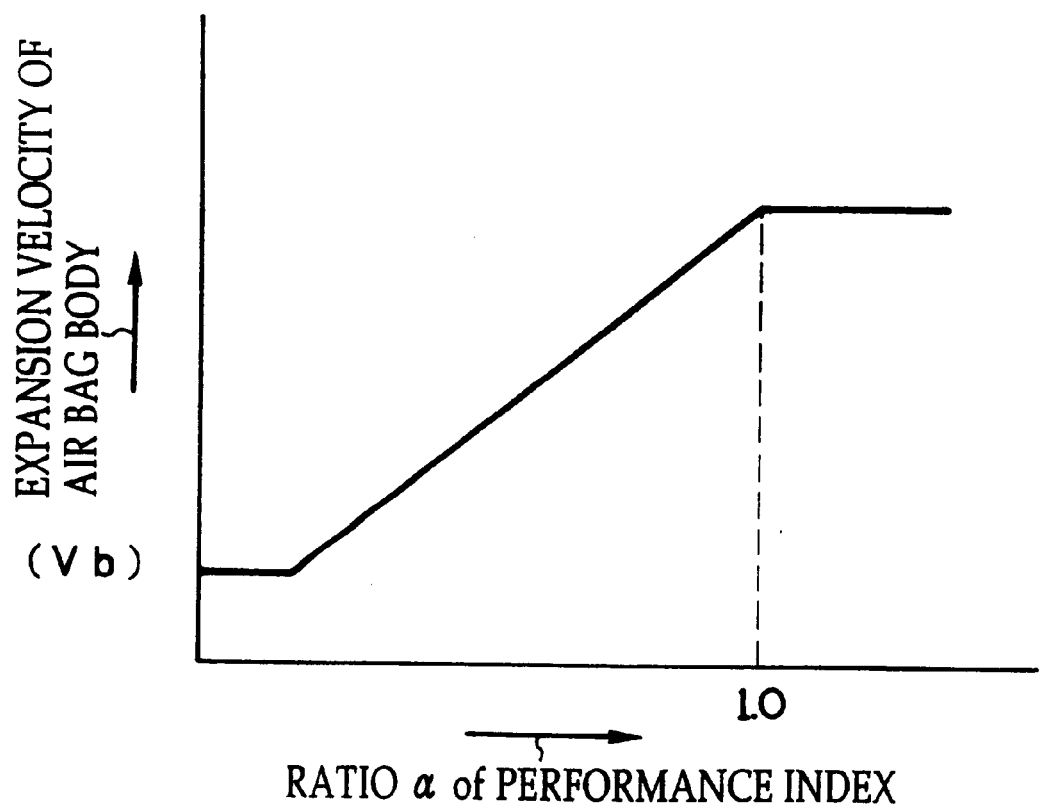
FIG. 20 is a graph of a relationship between a performance index and an expansion velocity of an air bag body.
Figure 21:
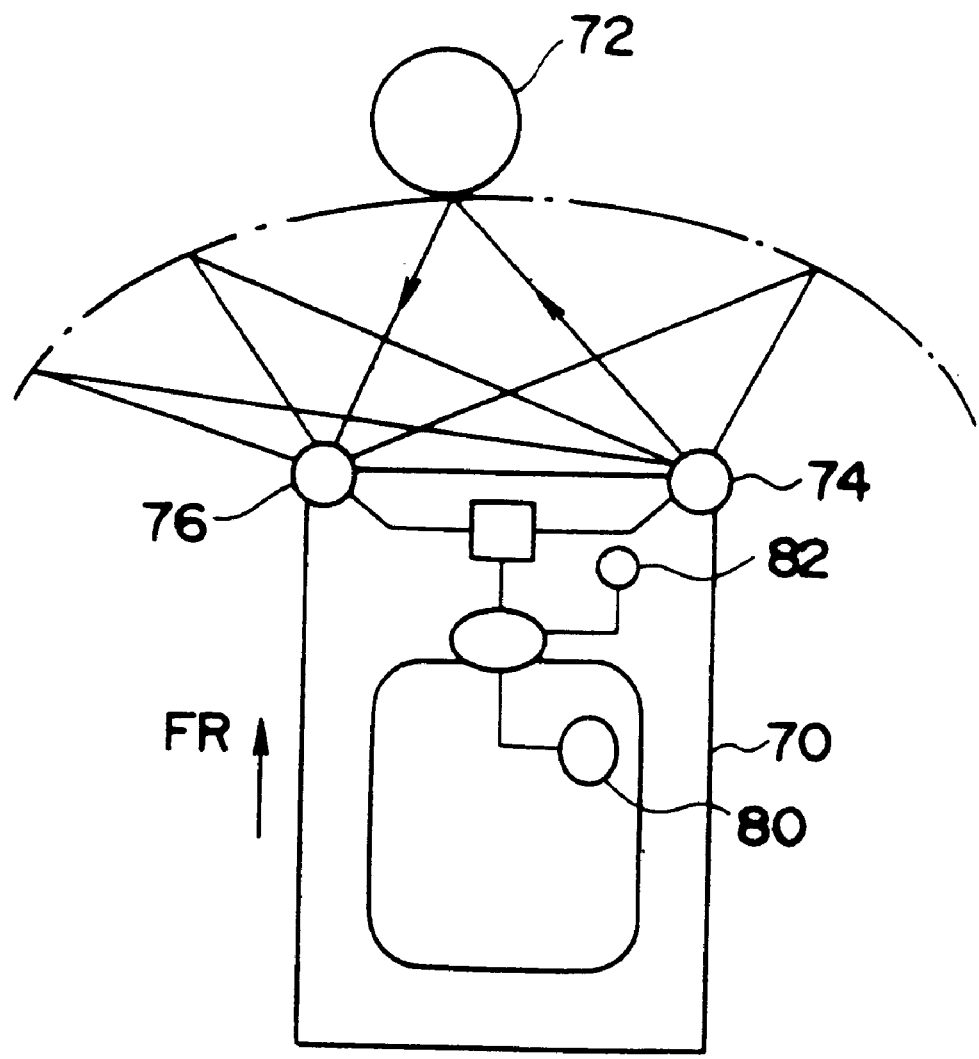
FIG. 21 is a schematic structural view of an obstacle detecting apparatus and a vehicle occupant protecting device using the same relating to a conventional embodiment.

As a result, as shown in FIG. 20, corresponding to ratio α of the performance index, for example, the expansion velocity of the air bag apparatus is regulated to the expansion velocity Vb which has been stored in advance. Therefore, in a region where the ratio α is greater than 1, i.e., the region where the collision damage becomes larger, the expansion velocity Vb is made to be maximum. However, in a region where the ratio α is less than 1, i.e., the region where the collision damage becomes smaller, as the ratio α becomes smaller, the expansion velocity Vb is decreased so as to lower the expansion velocity of the air bag body within a range that a protection effect using the air bag body can be secured. As a result, an optimal control on the air bag body can be effected.

As described above, a detailed description of the present invention according to the specified embodiments has been given. However, it will also be obvious to those skilled in the art that the present invention is not limited to the above described embodiments, and various modifications or changes can be made without departing from the spirit of the invention. For example, the vehicle occupant protecting device is not limited to the air bag apparatus. Instead, a seat belt pretensioner or the like can be used as a vehicle occupant protecting device.

What is claimed is:

1. An obstacle detecting apparatus which detects the distance between an obstacle and a vehicle, the apparatus comprising:

two electrical wave radar sensors for measuring the distance between the obstacle and the vehicle;

collision angle calculating means in which a plurality of positions of the obstacle is calculated via triangulation on the basis of distance information from said two electrical wave radar sensors, and a collision angle, which is formed between the obstacle and the vehicle, is calculated by the locus of the obstacle which is calculated based on said calculated plurality of positions of the obstacle; and collision velocity calculating means in which, a collision velocity in the direction of the collision angle is calculated, on the basis of the relative velocity and the angle, of the obstacle with respect to the vehicle, which are detected by said two electrical wave radar sensors, and the collision angle which has been calculated by said collision angle calculating means, said relative velocity being calculated by measuring of Doppler frequency, which is the difference in frequency between a transmitting wave and a receiving wave through a Doppler effect.

2. An obstacle detecting apparatus according to claim 1, further comprising:

threshold setting means in which a threshold of the collision acceleration for determining the collision by the collision angle and the collision velocity in the direction of said collision angle.

3. An obstacle detecting apparatus according to claim 2, further comprising: a collision sensor for detecting collision acceleration.

4. An obstacle detecting apparatus according to claim 2, further comprising:

collision determination means for determining the occurrence of a collision by comparing the collision acceleration detected by said collision sensor and the threshold set by said threshold setting means.

5. An obstacle detecting apparatus which detects the distance between an obstacle and a vehicle by two distance measuring sensors, comprising:

collision angle calculating means in which a plurality of positions of the obstacle is calculated via triangulation on the basis of distance information from said two distance measuring sensors, and a collision angle, which is formed between the obstacle and the vehicle, is calculated by the locus of the obstacle which is calculated by said calculated plurality of positions of the obstacle; and collision velocity calculating means in which, on the basis of distance information from said two distance measuring sensors, the collision velocity in the direction of the collision angle formed between the vehicle and the obstacle which has been calculated by said collision angle calculating means is calculated;

wherein said collision velocity calculating means selects a sensor having higher stability from said two distance measuring sensors on the basis of the collision angle detected by said two distance measuring sensors, and calculates the collision velocity in a direction of the collision angle formed between the vehicle and the obstacle by information from the selected distance measuring sensor.

6. An obstacle detecting apparatus according to claim 5, wherein, in a case in which the absolute value of the collision angle which has been detected by said two distance measuring sensors is less than or equal to a predetermined value, said collision velocity calculating means calculates the collision velocity in the direction of the collision angle formed between the vehicle and the obstacle on the basis of the predicted position of the collision.

7. An obstacle detecting apparatus which detects the distance between an obstacle and a vehicle by two distance measuring sensors, comprising:

collision angle calculating means in which a plurality of positions of the obstacle is calculated via triangulation on the basis of distance information from said two distance measuring sensors, and a collision angle, which is formed between the obstacle and the vehicle, is calculated by the locus of the obstacle which is calculated by said calculated plurality of positions of the obstacle;

collision velocity calculating means in which, on the basis of distance information from said two distance measuring sensors, the collision velocity in the direction of the collision angle formed between the vehicle and the obstacle which has been calculated by said collision angle calculating means is calculated;

threshold setting means in which a threshold of the collision acceleration for determining the collision by the collision angle and the collision velocity in the direction of said collision angle;

collision determination means for determining the occurrence of a collision by comparing the collision acceleration detected by said collision sensor and the threshold set by said threshold setting means; and wherein said collision determination means determines the occurrence of a collision by comparing the collision velocity determined by time integration of collision acceleration with the threshold of the collision velocity calculated by time integration of the threshold of collision acceleration.

8. A vehicle occupant protecting device with the use of an obstacle detecting apparatus which detects the distance between an obstacle and a vehicle by two electrical wave radar sensors, comprising:

collision angle calculating means in which a plurality of positions of the obstacle is calculated via triangulation on the basis of distance information from said two electrical wave radar sensors, and a collision angle, which is formed between the obstacle and the vehicle, is calculated by the locus of the obstacle which is calculated by said calculated plurality of positions of the obstacle;

collision velocity calculating means in which, on the basis of distance information from said two electrical wave radar sensors, the collision velocity in the direction of the collision angle formed between the vehicle and the obstacle which has been calculated by said collision angle calculating means is calculated;

a collision sensor for detecting collision acceleration;

threshold setting means in which a threshold of the collision acceleration for determining the collision by the collision angle and the collision velocity in the direction of said collision angle; and vehicle occupant protecting means which is operated in a case in which collision acceleration detected by said collision sensor is greater than the threshold set by the threshold setting means.

9. A vehicle occupant protecting device according to claim 8, further comprising:

operation control means of the vehicle occupant protecting means in which, before a collision, each of the relative velocity in the direction of the collision angle, the collision position, and the collision angle is calculated, and on the basis of the calculated results and the rise time of collision acceleration due to said collision sensor, an operating velocity of said vehicle occupant protecting means is controlled.

* * * * *

UNITED STATES PATENT AND TRADEMARK OFFICE
CERTIFICATE OF CORRECTION

PATENT NO. : 5,936,549
DATED : August 10, 1999
INVENTOR(s) : TSUCHIYA et al.

It is certified that error appears in the above-identified patent and that said Letters Patent is hereby corrected as shown below:

On the Title Page

Please change "[73]Assignee: Toyota Jidosha Kabushiki Kaisha, Toyota, Japan"

to

--[73] Assignee: Toyota Jidosha Kabushiki Kaisha, Toyota, Japan and Amerigon Inc., Irwindale, CA--

Signed and Sealed this

Twenty-ninth Day of August, 2000

Attest:

Q. TODD DICKINSON

Attesting Officer

Director of Patents and Trademarks